US012567879B2

(12) United States Patent
Lee

(10) Patent No.: US 12,567,879 B2
(45) Date of Patent: Mar. 3, 2026

(54) VARIABLE BANDPASS FILTER IN ULTRA-WIDEBAND RADIO

(71) Applicant: Infineon Technologies AG, Neubiberg (DE)

(72) Inventor: Daniel Lee, Salt Lake City, UT (US)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 18/731,512

(22) Filed: Jun. 3, 2024

(65) Prior Publication Data

US 2025/0373283 A1 Dec. 4, 2025

(51) Int. Cl.
H04L 25/03 (2006.01)
H04B 1/7163 (2011.01)

(52) U.S. Cl.
CPC ......... H04B 1/71637 (2013.01); H04L 25/03 (2013.01)

(58) Field of Classification Search
CPC ............................ H04B 1/71637; H04L 25/03

USPC ......................................................... 375/130
See application file for complete search history.

(56) References Cited

U.S. PATENT DOCUMENTS

| | | | | |
|---|---|---|---|---|
| 6,032,166 A | * | 2/2000 | Signell | H03H 17/02 |
| | | | | 708/3 |
| 2008/0273605 A1 | * | 11/2008 | Kennedy | H04L 25/4902 |
| | | | | 375/259 |
| 2025/0323681 A1 | * | 10/2025 | Khalifa | H04W 52/0216 |

* cited by examiner

*Primary Examiner* — Dominic D Saltarelli
(74) *Attorney, Agent, or Firm* — Eschweiler & Potashnik, LLC

(57) ABSTRACT

An ultra-wideband (UWB) radio includes a first bandpass filter, a first analog-to-digital converter (ADC), a baseband processor, and a first control circuit. The first bandpass filter is configured to filter a radio frequency (RF) signal according a first lower cutoff frequency and a first upper cutoff frequency, thereby forming a first filtered signal. The first ADC is configured to convert the first filtered signal to a first digital signal. The baseband processor is configured to process the first digital signal. The first control circuit is configured to control the first lower cutoff frequency and the first upper cutoff frequency.

17 Claims, 18 Drawing Sheets

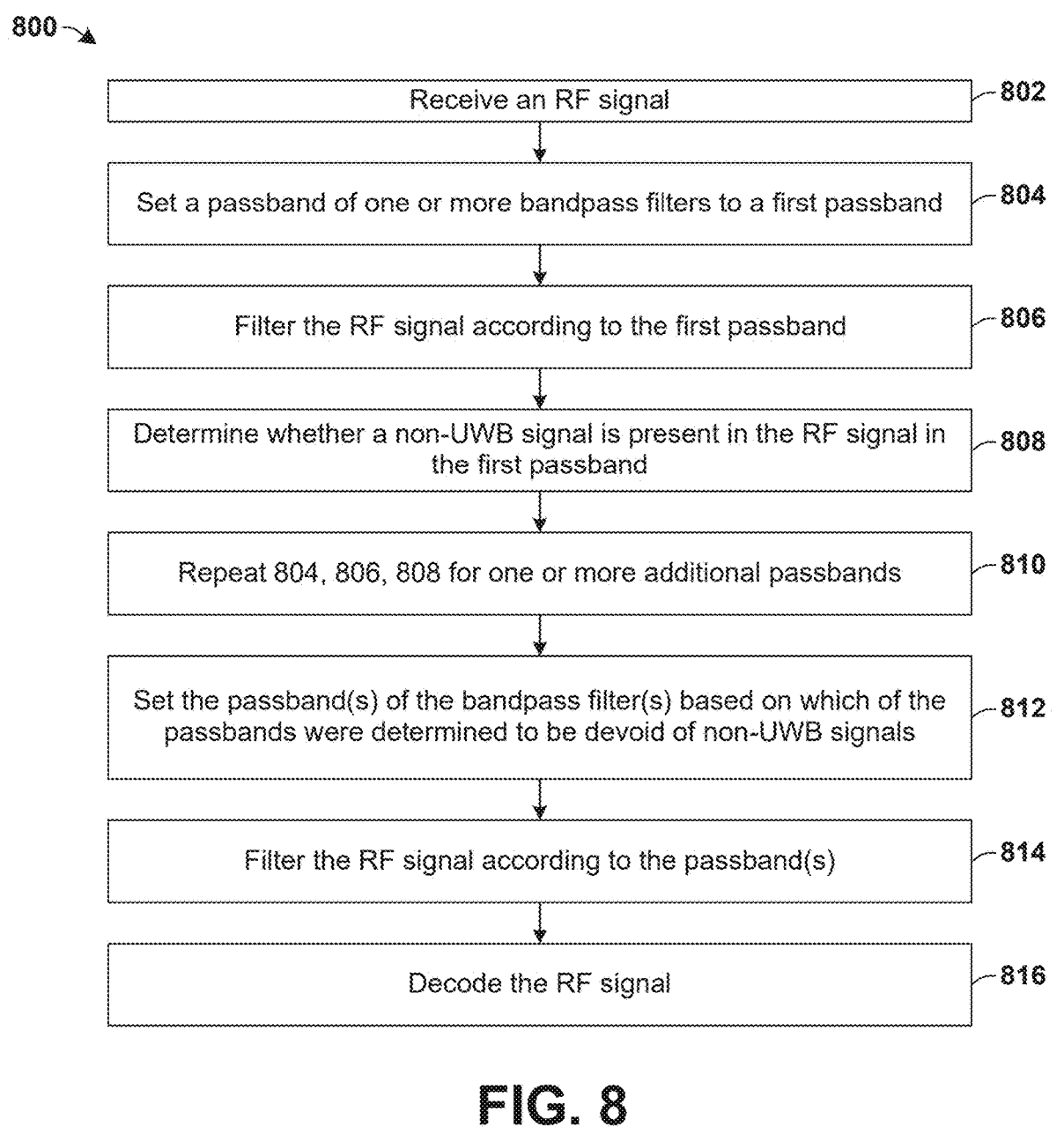

800

| Receive an RF signal | 802 |
|---|---|

| Set a passband of one or more bandpass filters to a first passband | 804 |
|---|---|

| Filter the RF signal according to the first passband | 806 |
|---|---|

| Determine whether a non-UWB signal is present in the RF signal in the first passband | 808 |
|---|---|

| Repeat 804, 806, 808 for one or more additional passbands | 810 |
|---|---|

| Set the passband(s) of the bandpass filter(s) based on which of the passbands were determined to be devoid of non-UWB signals | 812 |
|---|---|

| Filter the RF signal according to the passband(s) | 814 |
|---|---|

| Decode the RF signal | 816 |
|---|---|

FIG. 8

VARIABLE BANDPASS FILTER IN ULTRA-WIDEBAND RADIO

BACKGROUND

Many modern communication systems use ultra-wideband (UWB) radios. UWB radios transmit radio frequency (RF) signals at low energies over an ultra-wide bandwidth that is typically greater than 500 megahertz (MHz) wide.

BRIEF DESCRIPTION OF THE DRAWINGS

FIG. 8 illustrates a method of detecting and suppressing interference with a UWB radio.

DETAILED DESCRIPTION

Figure 1:
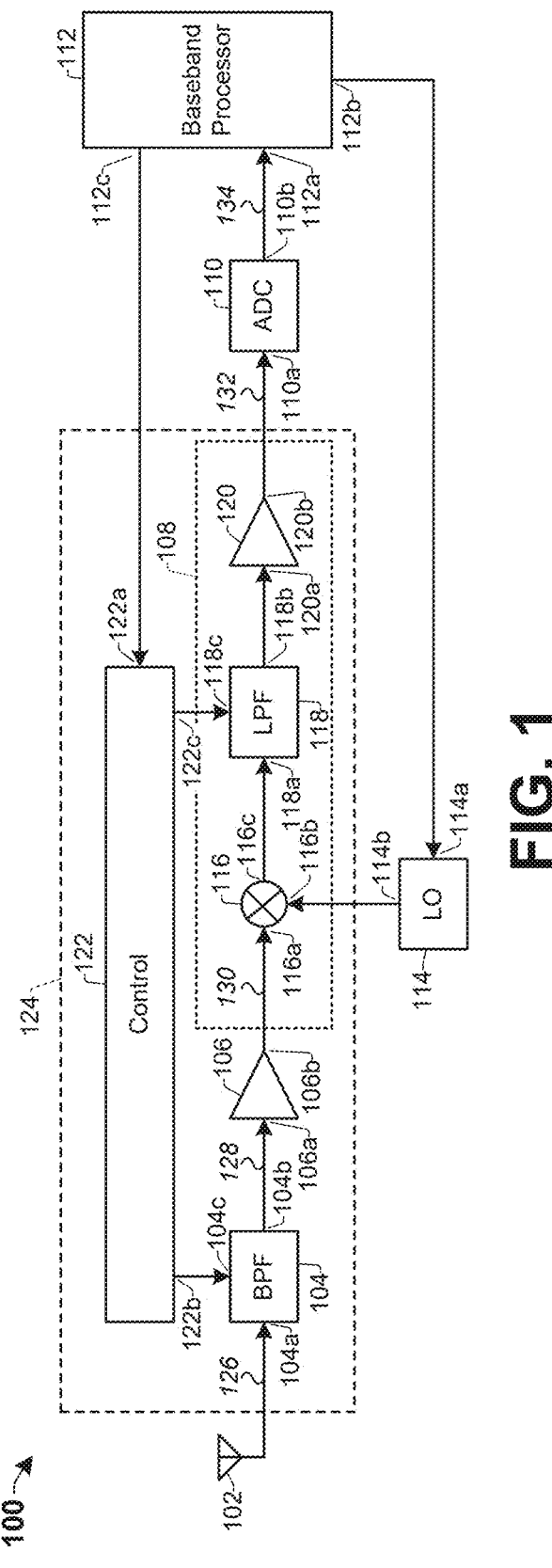
FIG. 1 illustrates an example of an ultra-wideband (UWB) radio including a bandpass filter.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware.

FIG. 1 illustrates an example of an ultra-wideband (UWB) radio 100.

The UWB radio 100 includes an antenna 102, a bandpass filter (BPF) 104, a first amplifier 106 (e.g., a low noise amplifier (LNA)), a down converter 108, an analog-to-digital converter (ADC) 110, a baseband processor 112, and a local oscillator (LO) 114. The bandpass filter 104 has an input 104a coupled to the antenna 102. The first amplifier 106 has an input 106a coupled to an output 104b of the bandpass filter 104. The down converter 108 includes a mixer 116, a lowpass filter (LPF) 118, and a second amplifier 120 (e.g., a variable gain amplifier (VGA)). The down converter 108 has a first input (a first input 116a of the mixer 116) coupled to an output 106b of the first amplifier 106. The down converter 108 has a second input (a second input 116b of the mixer 116) coupled to an output 114b of the local oscillator 114. The lowpass filter 118 has an input 118a coupled to an output 116c of the mixer 116. The second amplifier 120 has an input 120a coupled to an output 118b of the lowpass filter 118. The ADC 110 has an input 110a coupled to an output of the down converter 108 (an output 120b of the second amplifier 120). The baseband processor 112 has an input 112a coupled to an output 110b of the ADC 110. The baseband processor 112 has an output 112b coupled to an input 114a of the local oscillator 114.

The first antenna 102 is adapted to receive radio frequency (RF) signals 126. The bandpass filter 104 is configured to filter the RF signal 126 at the first antenna 102. The first amplifier 106 is configured to amplify the filtered signal 128. The down converter 108 is configured to down convert the amplified signal 130 with a controllable bandwidth. The bandwidth of the down converter 108 can be controlled by controlling the cutoff frequency of the lowpass filter 118. The ADC 110 is configured to convert the down converted signal 132 from analog to a digital signal 134. The baseband processor 112 is configured to process the digital signal 134.

A UWB signal (e.g., signal 202 of FIG. 2A) has a bandwidth greater than 500 MHz and has a relatively low signal power (e.g., less than a noise floor of the radio). In some UWB radios, the passband 212 of the bandpass filter 104 is set to a fixed frequency range that is at least as wide as the bandwidth of the UWB signal(s) it is configured to receive, as illustrated by the frequency response 204 of the bandpass filter 104 shown in FIG. 2A. For example, the lower cutoff frequency of the bandpass filter is less than or equal to lowest frequency component of UWB signal 202, and the upper cutoff frequency of the bandpass filter 104 is greater than or equal to the highest frequency component of the UWB signal 202.

Figure 2A:
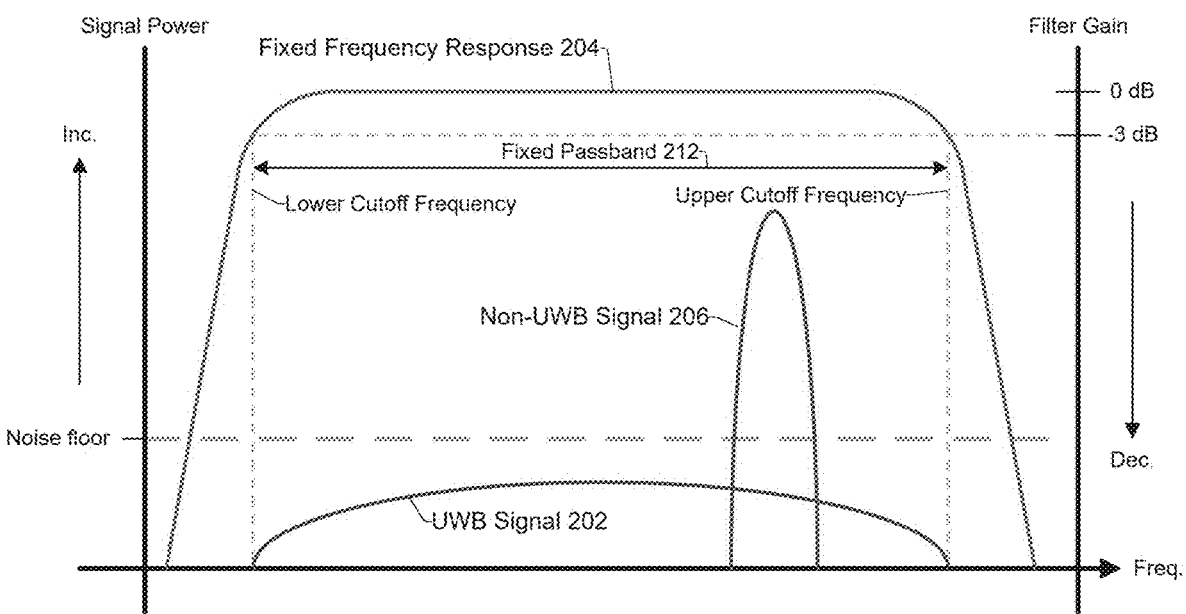
FIGS. 2A-2D illustrate an example of an RF signal received by the UWB radio and a frequency response of the bandpass filter.

A challenge with some such radios is that when a non-UWB signal 206 (e.g., a signal having a bandwidth less than 500 MHz and a signal power greater than the noise floor, such as a narrowband signal, a broadband signal, or the like) exists within a same portion of the frequency spectrum as a UWB signal 202, as illustrated in FIGS. 2A-2D, the bandpass filter 104 may fail to filter out (e.g., attenuate) the non-UWB signal 206 because the non-UWB signal 206 is in the passband 212 of the bandpass filter 104, as shown in FIG. 2A. Consequently, the non-UWB signal 206 may interfere with the UWB signal 202 in the UWB radio 100. This interference may degrade the performance of the UWB radio 100. For example, this interference may cause substantial (e.g., uncorrectable) errors when attempting to decode the UWB signal, which may make the UWB signal unreadable.

In some examples, a notch filter (not shown) may be added to the UWB radio 100 before the bandpass filter 104 to filter out the non-UWB signal 206. However, adding a notch filter to the UWB radio 100 may increase a cost and/or a complexity of the UWB radio 100.

In various examples of the present disclosure, the bandpass filter 104 is variable (has tunable cutoff frequencies) so that non-UWB signals (e.g., signal 206 of FIGS. 2A-2D) can be filtered out by varying the passband of the bandpass filter 104 and adjusting the cutoff frequency of the lowpass filter 118 to avoid the non-UWB signals, thereby improving a performance of the UWB radio 100 without increasing a cost and/or a complexity of the UWB radio 100.

The UWB radio 100 further includes a control circuit 122 coupled to the bandpass filter 104. The control circuit 122 has a first output 122b coupled to a control terminal 104c of the bandpass filter 104 and a second output 122c coupled to a control terminal 118c of the lowpass filter 118. In some examples, the control circuit 122 has an input 122a coupled to an output 112c of the baseband processor 112. The control circuit 122 is configured to control the passband of the bandpass filter 104. In some examples, the control circuit 122 controls the passband by controlling the lower cutoff frequency and the upper cutoff frequency of the bandpass filter 104. In some examples, the control circuit 122 controls the passband by controlling the width of the passband (e.g., the bandwidth) and the center frequency of the passband. In some examples, the control circuit 122 is configured to control the passband of the bandpass filter 104 based on one or more signals (e.g., instructions) from the baseband processor 112. The control circuit 122 is configured to control the width of the passband of the lowpass filter 118 according to the width of the passband of the bandpass filter 104. For example, the control circuit 122 controls the cutoff frequency of the lowpass filter 118 based on a difference between the upper cutoff frequency and the lower cutoff frequency of the bandpass filter 104. The bandpass filter 104, the first amplifier 106, the down converter 108, and the control circuit 122 are part of the analog frontend of a receiver 124 of the UWB radio 100.

Figure 2B:
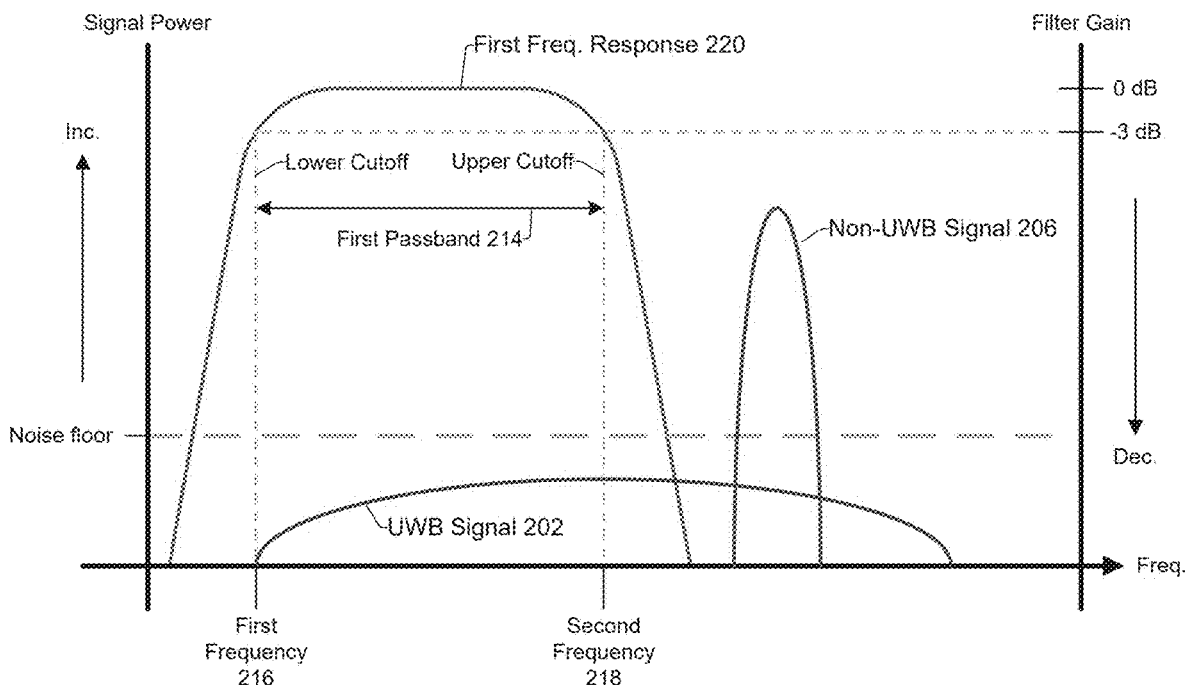

In some examples, the first antenna 102 is adapted to receive an RF signal including the UWB signal 202 and the non-UWB signal 206 shown in FIGS. 2A-2D. The control circuit 122 is configured to set the passband of the bandpass filter 104 to a first subsection of the spectrum in which the UWB signal 202 is transmitted, as illustrated by the first frequency response 220 of the bandpass filter 104 shown in FIG. 2B. For example, the control circuit 122 is configured to set a passband of the bandpass filter 104 to a first passband 214 having a lower cutoff frequency at a first frequency 216 and an upper cutoff frequency at a second frequency 218 greater than the first frequency 216, as shown in FIG. 2B. A difference between the second frequency 218 and the first frequency 216 is less than 500 MHz. The control circuit 122 is configured to set the cutoff frequency of the lowpass filter 118 according to the difference between the second frequency 218 and the first frequency 216.

The bandpass filter 104 is configured to filter the RF signal according to the first passband 214, thereby forming a first filtered signal. The first amplifier 106 is configured to amplify the first filtered signal, thereby forming a first amplified signal. The down converter 108 is configured to center and down convert the first amplified signal to baseband, thereby forming a first down converted signal, filter the first down converted signal at the lowpass filter 118 according to the passband of the lowpass filter 118 (which is set by the control circuit 122 based on the width of the passband of the bandpass filter 104), and amplify the first down converted signal at the second amplifier 120. The ADC 110 is configured to convert the first down converted signal to a first digital signal. The baseband processor 112 is configured to determine whether a non-UWB signal is present in this first band of the RF signal (between the first frequency 216 and the second frequency 218) based on the first digital signal.

Figure 2C:
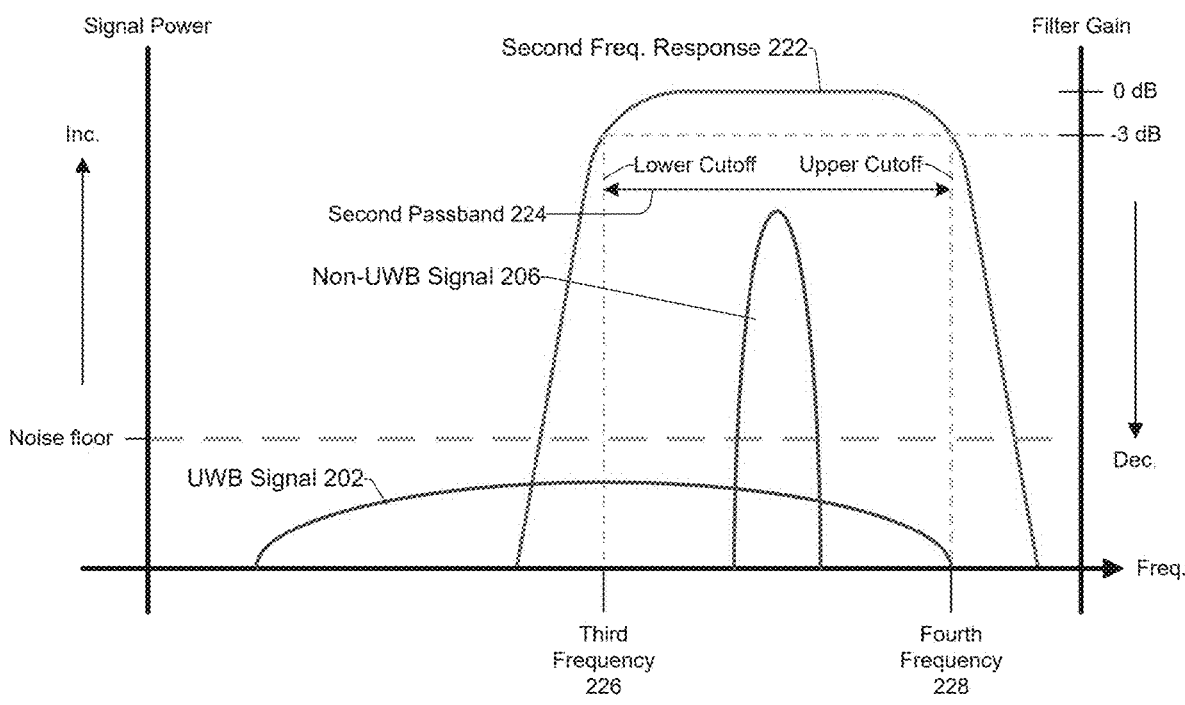

Next, the control circuit 122 is configured to set the passband of the bandpass filter 104 to a different subsection of the spectrum in which the UWB signal 202 is transmitted, as illustrated by the second frequency response 222 of the bandpass filter 104 shown in FIG. 2C. For example, the control circuit 122 is configured to set the passband of the bandpass filter to a second passband 224 having a lower cutoff frequency at a third frequency 226, greater than the first frequency 216, and an upper cutoff frequency at a fourth frequency 228 greater than the third frequency 226 and the second frequency 218, as shown in FIG. 2C. A difference between the fourth frequency 228 and the third frequency 226 is less than 500 MHz.

The bandpass filter 104 is configured to filter the RF signal according to the second passband 224, thereby forming a second filtered signal. The first amplifier 106 is configured to amplify the second filtered signal, thereby forming a second amplified signal. The down converter 108 is configured to down convert the second amplified signal, thereby forming a second down converted signal. The ADC 110 is configured to convert the second down converted signal to a second digital signal. The baseband processor 112 is configured to determine whether a non-UWB signal is present in this second band of the RF signal (between the third frequency 226 and the fourth frequency 228) based on the second digital signal.

In the example illustrated in FIG. 2A-2D, the baseband processor 112 determines that a non-UWB signal is not present in the first band of the RF signal (between the first frequency 216 and the second frequency 218) and determines that a non-UWB signal is present in the second band of the RF signal (between the third frequency 226 and the fourth frequency 228). This "scanning" of different bands of the RF signal and determining which bands have interference and which bands are devoid of non-UWB signals is an assessment of which subsections of the spectrum are "clear".

Figure 2D:
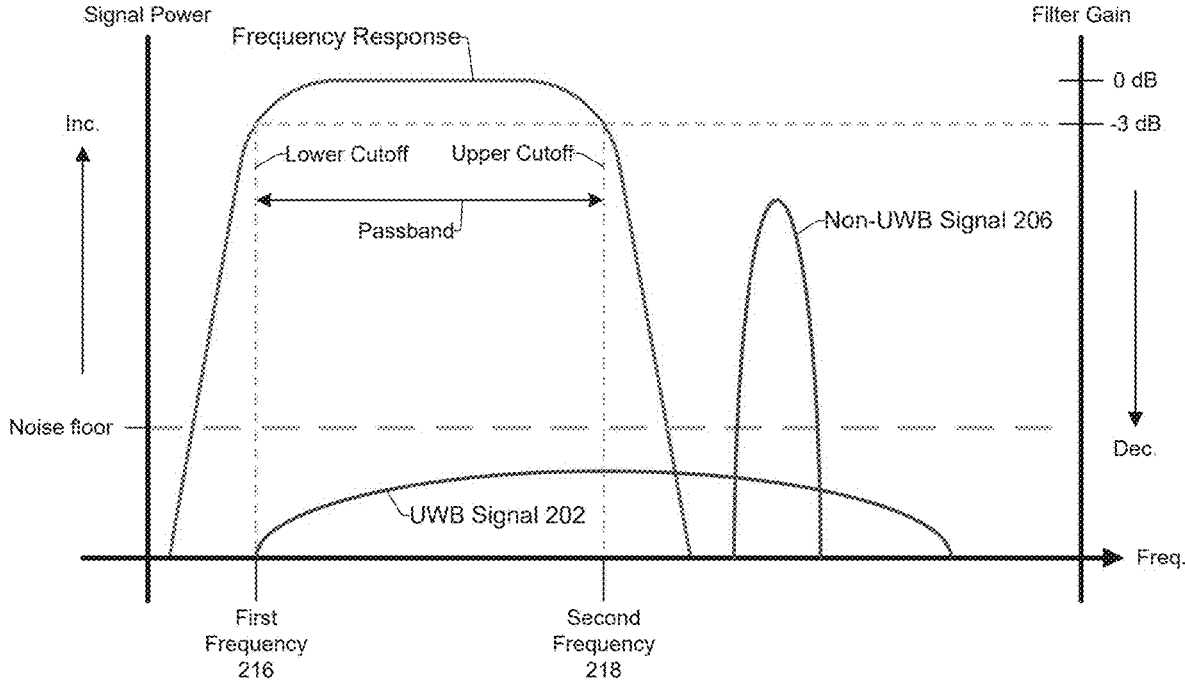

Next, the control circuit 122 is configured to set the passband of the bandpass filter 104 based on which of the subsections of the spectrum were determined to be devoid of non-UWB signals so that the UWB radio 100 can filter out interference before decoding the received RF signal, thereby improving a performance of the UWB radio 100. In the example illustrated in FIGS. 2A-2D, the control circuit 122 is configured to set the lower cutoff frequency of the bandpass filter 104 to the first frequency 216 and set the upper cutoff frequency of the bandpass filter 104 to the second frequency 218, as illustrated in FIG. 2D, because non-UWB signals are determined to not be present in the first band of the RF signal (extending from the first frequency 216 to the second frequency 218) and because a non-UWB signal is determined to be present in the second band of the RF signal (extending from the third frequency 226 to the fourth frequency 228).

The RF signal is then filtered (by the bandpass filter 104) according to these cutoff frequencies to remove the interfering non-UWB signals (e.g., signal 206) from the RF signal. The baseband processor 112 then proceeds to decoding the filtered signal. Although a portion of the UWB signal 202 may be filtered out (e.g., attenuated) where interference exists, the remaining portion of the UWB signal 202 may be interference-free. Thus, substantial errors (e.g., errors which may render the signal unreadable) can be avoided. As a result, an overall performance of the UWB radio 100 can be improved. Further, making the bandpass filter 104 variable may not add substantial cost nor complexity to the UWB radio 100.

In some examples, in addition to setting the passband of the bandpass filter 104 based on which of the subsections of the spectrum were determined to be devoid of non-UWB signals, the frequency of the local oscillator 114 is also adjusted based on which of the subsections of the spectrum were determined to be devoid of non-UWB signals. For example, the frequency of the local oscillator 114 may be set to a frequency within the band of the spectrum that was determined to be devoid of non-UWB signals (e.g., between the first frequency 216 and the second frequency 218 in the example illustrated in FIGS. 2A-2D). In some examples, the frequency of the local oscillator 114 may be adjusted based on one or more signals (e.g., instructions) from the baseband processor 112. The bandwidth of the down converter 108 can also be adjusted by adjusting the cutoff frequency of the variable lowpass filter 118.

In examples where the second band of the RF signal (extending from the third frequency 226 to the fourth frequency 228) is determined to be devoid of non-UWB signals and at least one non-UWB signal is determined to be present in the first band of the RF signal (extending from the first frequency 216 to the second frequency 218), the control circuit 122 is configured to set the lower cutoff frequency of the bandpass filter 104 to the third frequency 226 and set the upper cutoff frequency of the bandpass filter 104 to the fourth frequency 228 so that the "clear" channel (the second band) is passed and the channel experiencing interference (the first band) is attenuated.

In examples where the first band of the RF signal and the second band of the RF signal are both determined to be devoid of non-UWB signals, the control circuit 122 is configured to set the lower cutoff frequency of the bandpass filter 104 to the first frequency 216 and set the upper cutoff frequency of the bandpass filter 104 to the fourth frequency 228.

In some examples, the third frequency 226 is less than or equal to second frequency 218. In some examples, a difference between the second frequency 218 and the first frequency 216 is approximately equal to a difference between the fourth frequency 228 and the third frequency 226 (e.g., a width of the first band is approximately equal to a width of the second band). In some other examples, the difference between the second frequency 218 and the first frequency 216 is different than the difference between the fourth frequency 228 and the third frequency 226 (e.g., the width of the first band is different than the width of the second band). In some examples, the widths of the bands can be tuned to balance resolution with processing. For example, the width of the bands (e.g., the first passband 214 and the second passband 224) can be reduced to increase a resolution of the "scanning" of the bands so that the position of the interference in the frequency spectrum can be more closely determined. Conversely, the width of the bands can be increased to reduce a processing time and/or processing power of the "scanning" of the bands.

Although the cutoff frequencies of the bandpass filter 104 are shown as corresponding to the −3 dB mark in the frequency response of the bandpass filter, it will be appreciated that in some examples the cutoff frequency may alternatively be defined as corresponding to some other degree of attenuation (e.g., −2 dB, −4 dB, etc.). Although a transmitter is not shown in FIG. 1 for simplicity of illustration, it will be appreciated that the UWB radio 100 can include transmitter.

Figure 3:
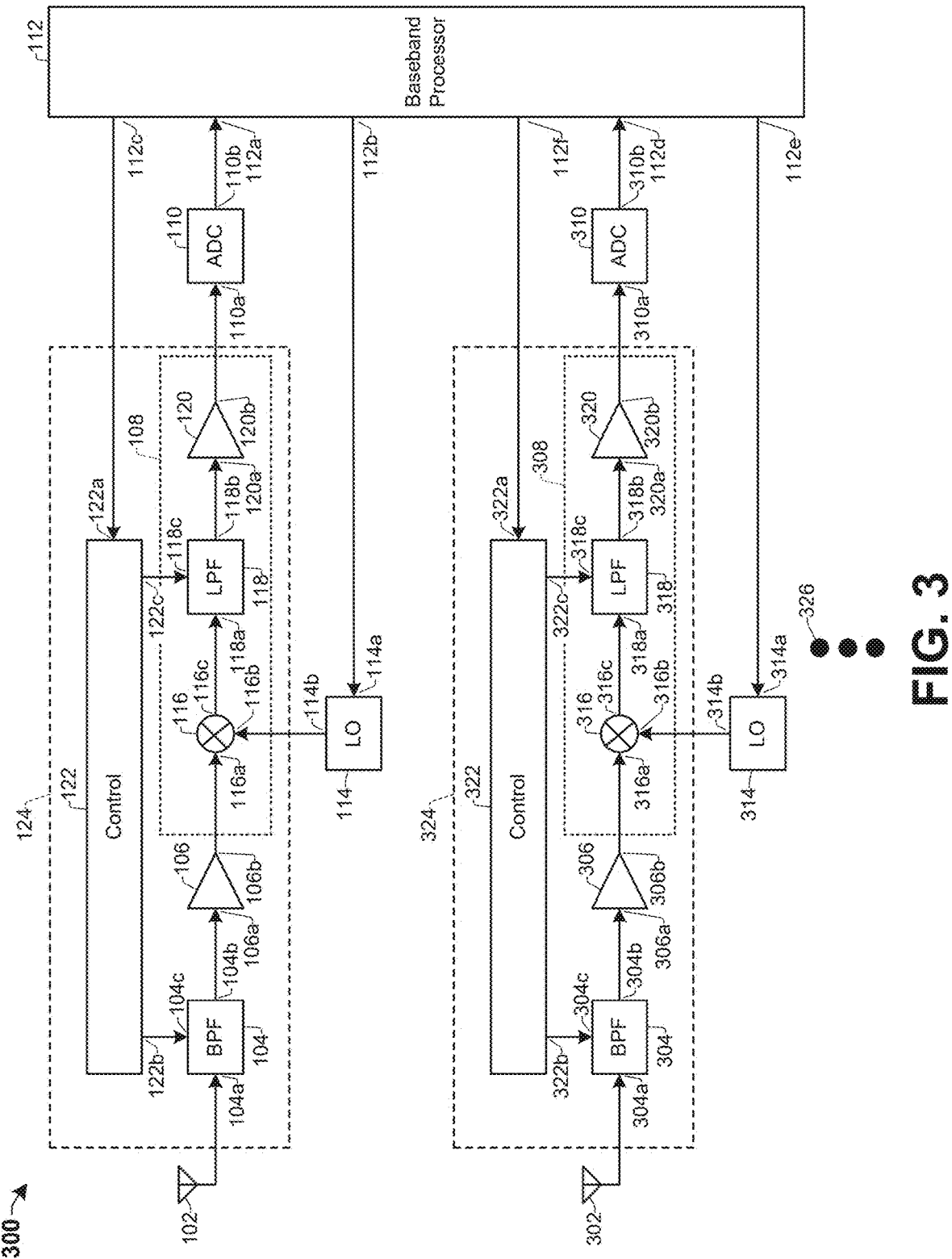
FIG. 3 illustrates an example of a UWB radio including a plurality of receivers.

FIG. 3 illustrates an example of an ultra-wideband (UWB) radio 300 including a first receiver 124 and a second receiver 324.

The first receiver 124 includes an antenna 102, a bandpass filter 104, a first amplifier 106, a down converter 108, and a control circuit 122, as described with reference to FIG. 1. Similarly, the second receiver 324 includes: an antenna 302; a variable bandpass filter 304 having an input 304a, an output 304b, and a control terminal 304c; a first amplifier 306 having an input 306a and an output 306b; a down converter 308 (including a mixer 316 having inputs 316a, 316b and an output 316c, a lowpass filter 318 having an input 318a, an output 318b, and a control terminal 318c, and a second amplifier 320 having an input 320a and an output 320b); and a control circuit 322 having an input 322a, a first output 322b, and a second output 322c.

The components of the second receiver 324 are coupled together as described with regard to the components of the first receiver 124 with reference to FIG. 1 (e.g., the second receiver 324 is a copy of the first receiver 124). Input 322a of control circuit 322 is coupled to an output 112f of the baseband processor 112. An ADC 310 has an input 310a coupled to an output of down converter 308 (output 320b of second amplifier 320). ADC 310 has an output 310b coupled to an input 112d of the baseband processor 112. A local oscillator 314 has an input 314a coupled to an output 112e of the baseband processor 112. Local oscillator 314 has an output 314b coupled to input 316b of mixer 316. Antenna 302 is spaced from antenna 102.

Although FIG. 3 illustrates a UWB radio 300 having two receivers, it will be appreciated that in some other examples, the UWB radio 300 may have some other number of receivers (e.g., 3 receivers, 4 receivers, etc.), as indicated by ellipses 326.

Figure 4A:
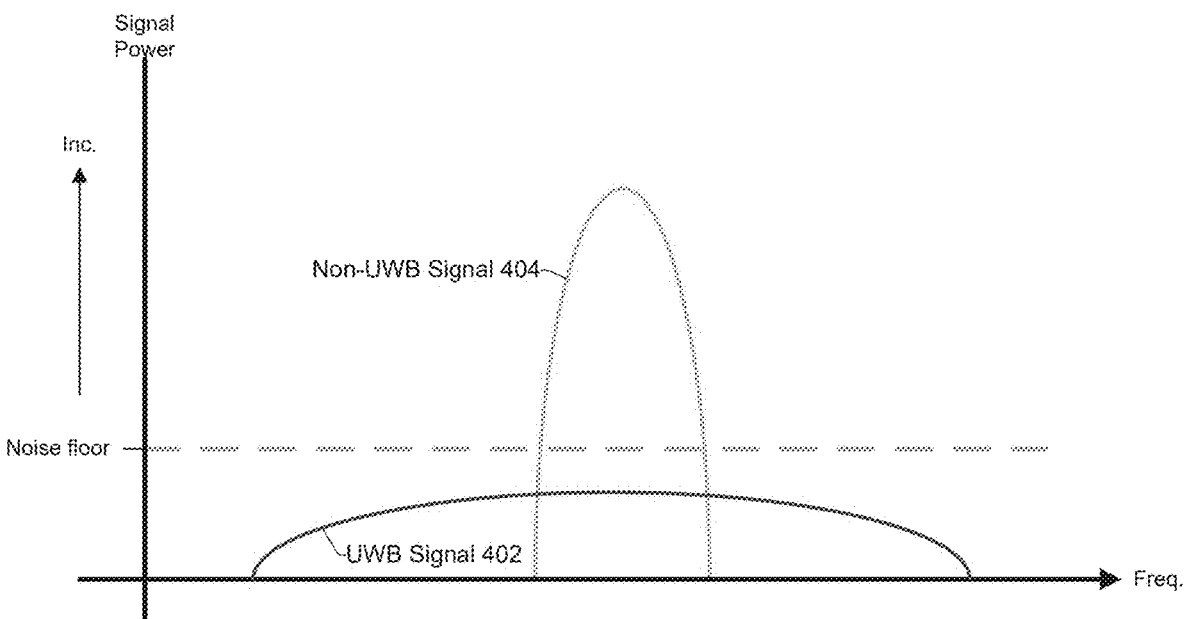
FIGS. 4A-4E, FIGS. 5A-5E, FIGS. 6A-6F, and FIGS. 7A-7G illustrate various other examples of RF signals received by the UWB radio and frequency responses of the bandpass filter.
Figure 4B:
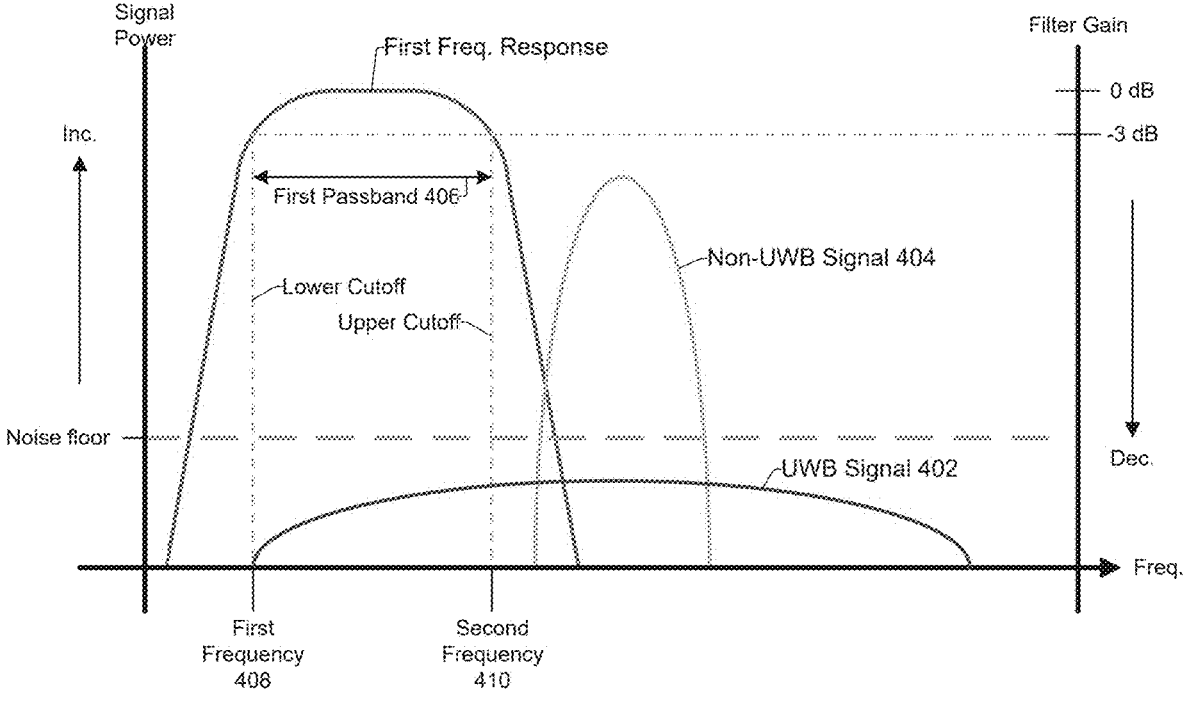

In some examples, antennas 102, 302 are adapted to receive an RF signal including the UWB signal 402 and the non-UWB signal 404 shown in FIGS. 4A-4E. Control circuit 122 is configured to set a passband of bandpass filter 104 to a first passband 406 having a lower cutoff frequency at a first frequency 408 and an upper cutoff frequency at a second frequency 410 greater than the first frequency 408, as shown in FIG. 4B. A difference between the second frequency 410 and the first frequency 408 is less than 500 MHz. Similarly, control circuit 322 is configured to set a passband of bandpass filter 304 to the first passband 406.

Bandpass filters 104, 304 are configured to filter the RF signal according to the first passband 406, thereby forming a pair of first filtered signals. First amplifiers 106, 306 are configured to amplify the first filtered signals, respectively, thereby forming a pair of first amplified signals, respectively. Down converter 108, 308 are configured to down convert the first amplified signals, respectively, thereby forming a pair of first down converted signals, respectively. ADCs 110, 310 are configured to convert the first down converted signals to a pair of first digital signals, respectively. The baseband processor 112 is configured to determine whether a non-UWB signal is present in this first band of the RF signal (between the first frequency 408 and the second frequency 410) based on the pair of first digital signals.

Figure 4C:
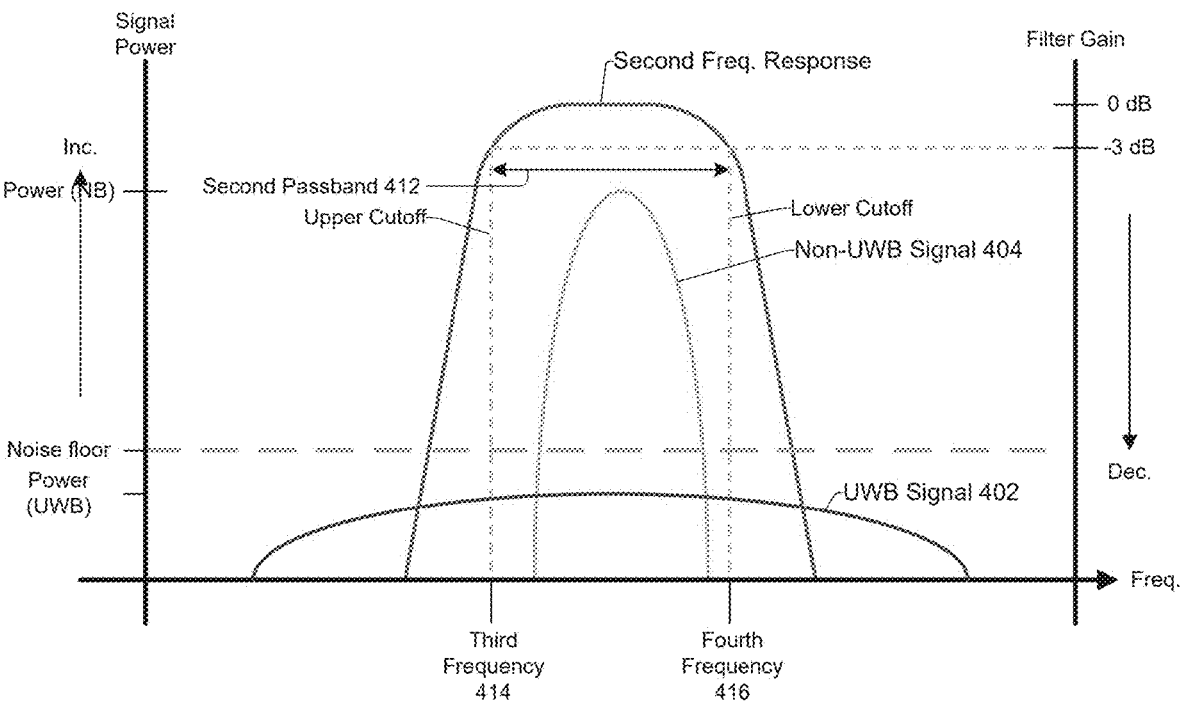

Next, control circuits 122, 322 are configured to set the passbands of bandpass filters 104, 304, respectively, to a second passband 412 having a lower cutoff frequency at a third frequency 414, greater than the first frequency 408 (and less than or equal to the second frequency 410), and an upper cutoff frequency at a fourth frequency 416 greater than the third frequency 414 and the second frequency 410, as shown in FIG. 4C. A difference between the fourth frequency 416 and the third frequency 414 is less than 500 MHz.

Bandpass filters 104, 304 are configured to filter the RF signal according to the second passband 412, thereby forming a pair of second filtered signals. First amplifiers 106, 306 are configured to amplify the second filtered signals, respectively, thereby forming a pair of second amplified signals, respectively. Down converters 108, 308 are configured to down convert the second amplified signals, respectively, thereby forming a pair of second down converted signals, respectively. ADCs 110, 310 are configured to convert the second down converted signals to a pair of second digital signals, respectively. The baseband processor 112 is configured to determine whether a non-UWB signal is present in this second band of the RF signal (between the third frequency 414 and the fourth frequency 416) based on the pair of second digital signals.

Figure 4D:
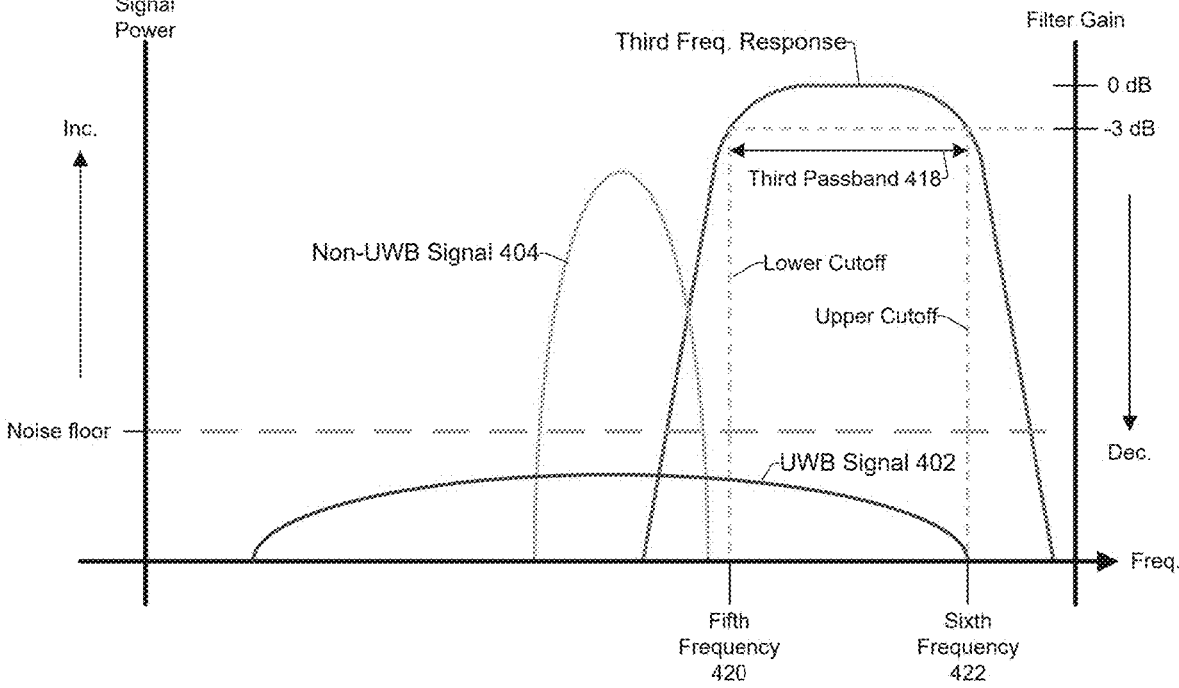

Next, control circuits 122, 322 are configured to set the passbands of bandpass filters 104, 304, respectively, to a third passband 418 having a lower cutoff frequency at a fifth frequency 420, greater than the third frequency 414 (and less than or equal to the fourth frequency 416), and an upper cutoff frequency at a sixth frequency 422 greater than the fifth frequency 420 and the fourth frequency 416, as shown in FIG. 4D. A difference between the sixth frequency 422 and the fifth frequency 420 is less than 500 MHz.

Bandpass filters 104, 304 are configured to filter the RF signal according to the third passband 418, thereby forming a pair of third filtered signals. First amplifiers 106, 306 are configured to amplify the third filtered signals, respectively, thereby forming a pair of third amplified signals, respectively. Down converters 108, 308 are configured to down convert the third amplified signals, respectively, thereby forming a pair of third down converted signals, respectively. ADCs 110, 310 are configured to convert the third down converted signals to a pair of third digital signals, respectively. The baseband processor 112 is configured to determine whether a non-UWB signal is present in this third band of the RF signal (between the fifth frequency 420 and the sixth frequency 422) based on the pair of third digital signals.

In the example illustrated in FIGS. 4A-4E, the baseband processor 112 determines that a non-UWB signal is not present in the first band of the RF signal (between the first frequency 408 and the second frequency 410), that a non-UWB signal is present in the second band of the RF signal (between the third frequency 414 and the fourth frequency 416), and that a non-UWB signal is not present in the third band of the RF signal (between the fifth frequency 420 and the sixth frequency 422).

Figure 4E:
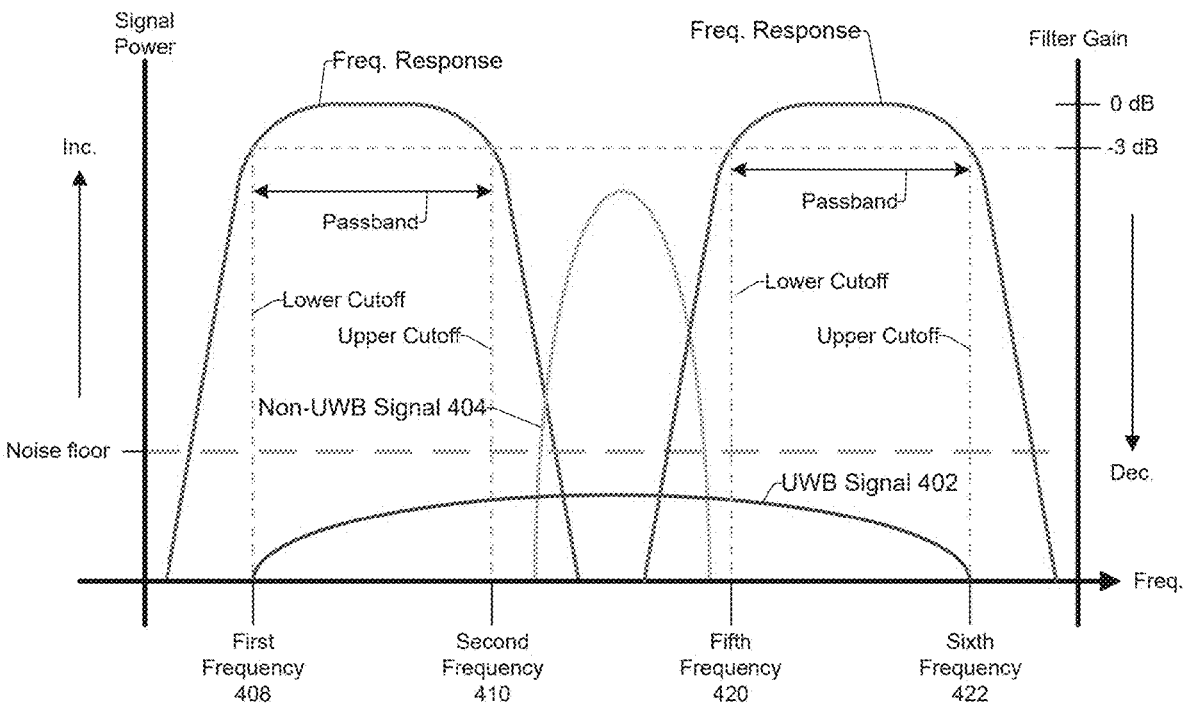
Figure 5A:
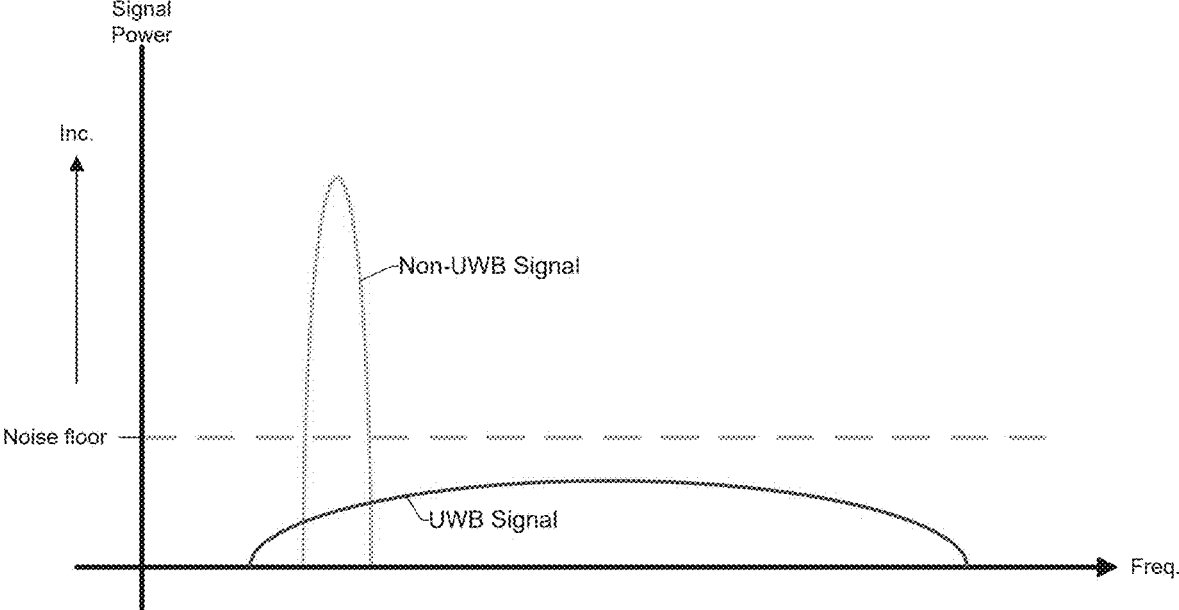
Figure 5B:
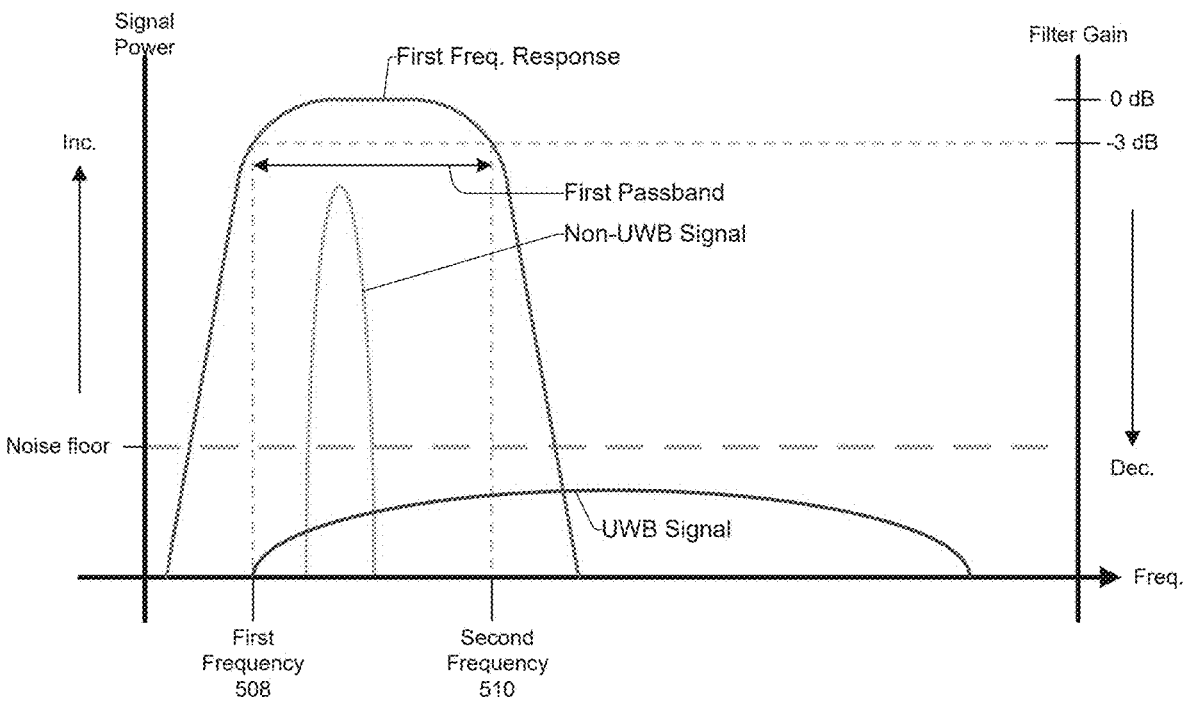
Figure 5C:
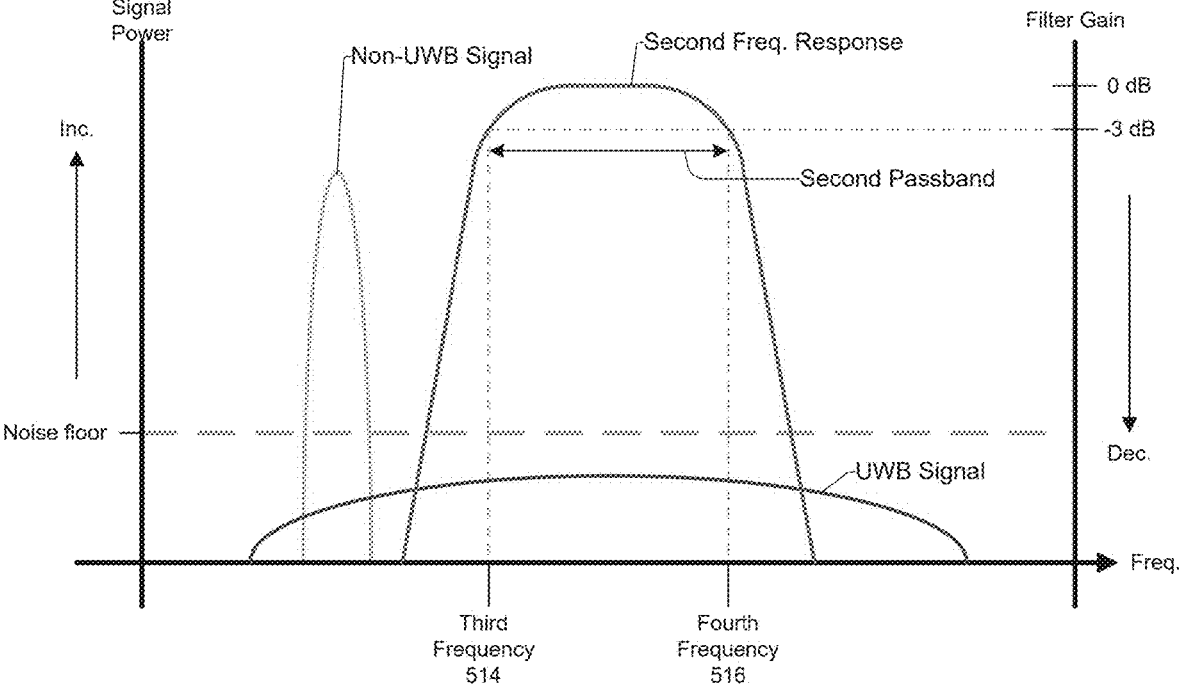
Figure 5D:
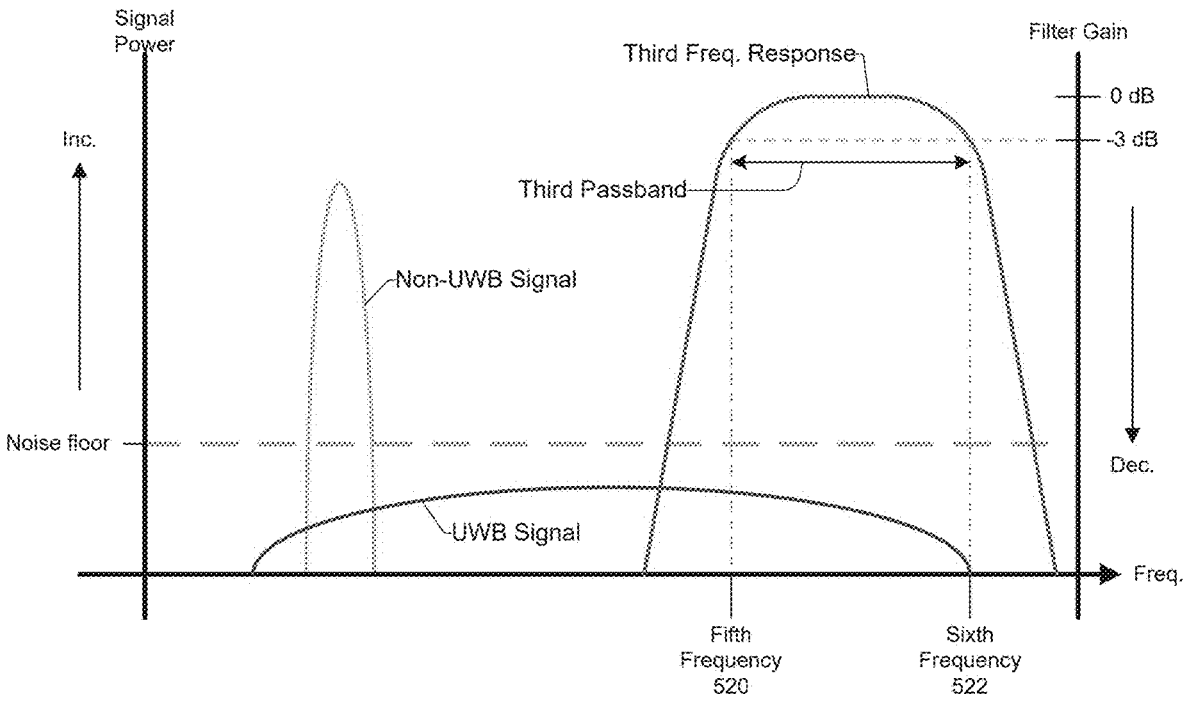
Figure 5E:
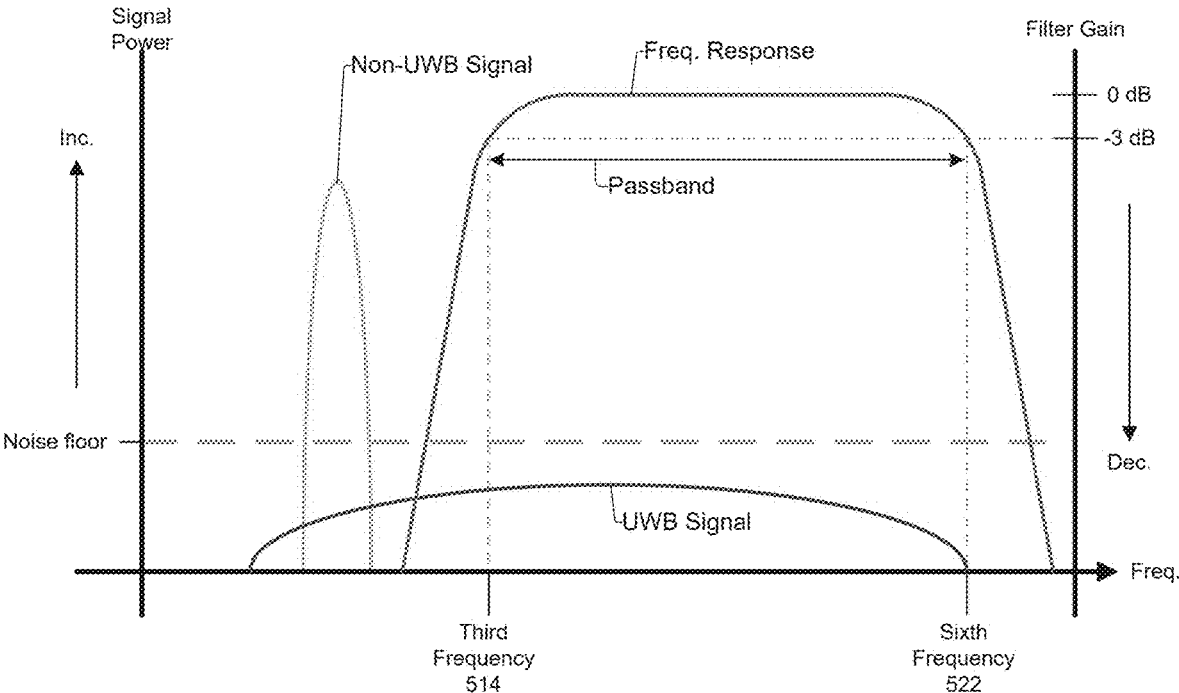

Because a non-UWB signal is determined to be present between two non-adjacent bands (e.g., a non-UWB signal is determined to be present in the second band which is between the first band and the third band), the passband of one of the bandpass filters (e.g., bandpass filter 104) is set to the lower "clear" band and the passband of the other of the bandpass filters (e.g., bandpass filter 304) is set to the upper "clear" band. For example, control circuit 122 is configured to set the lower cutoff frequency of bandpass filter 104 to the first frequency 408 and set the upper cutoff frequency of bandpass filter 104 to the second frequency 410, as illustrated in FIG. 4E. Further, control circuit 322 is configured to set the lower cutoff frequency of bandpass filter 304 to the fifth frequency 420 and set the upper cutoff frequency of bandpass filter 304 to the sixth frequency 422, as illustrated in FIG. 4E. Thus, the bandpass filters 104, 304 together form a kind of notch filter to attenuate the interference. The RF signal is then filtered (by bandpass filters 104, 304) according to these cutoff frequencies to attenuate the interfering non-UWB signals (e.g., signal 404). The UWB radio 100 then proceeds to decoding the filtered signal.

Although the "scanning" of each band to detect interference therein is described as being performed by both the first receiver and the second receiver together, in some alternative examples, the first receiver may "scan" one band (e.g., the first band) while the second receiver "scans" a different band (e.g., the second band). For example, control circuit 122 may set the passband of bandpass filter 104 to the first passband 406 while control circuit 322 sets the passband of bandpass filter 304 to the second passband 412. By scanning different bands with different receivers, the time taken by the scanning process may be reduced.

In some examples, as illustrated in FIGS. 5A-5E, the baseband processor 112 determines that a non-UWB signal is present in the first band of the RF signal (between the first frequency 508 and the second frequency 510), that a non-UWB signal is not present in the second band of the RF signal (between the third frequency 514 and the fourth frequency 516), and determines that a non-UWB signal is not present in the third band of the RF signal (between the fifth frequency 520 and the sixth frequency 522).

In response, in some examples, control circuits 122, 322 are configured to set the lower cutoff frequency of bandpass filters 104, 304 to the third frequency 514 and set the upper cutoff frequency of bandpass filters 104, 304 to the sixth frequency 522. In some other examples, control circuit 122 is configured to set the lower cutoff frequency of bandpass filter 104 to the third frequency 514 and set the upper cutoff frequency of bandpass filter 104 to the fourth frequency 516 while control circuit 322 is configured to set the lower cutoff frequency of bandpass filter 304 to the fifth frequency 520 and set the upper cutoff frequency of bandpass filter 304 to the sixth frequency 522. By setting the passbands of the bandpass filters 104, 304 to separate sections of the spectrum, each band can be filtered separately. Thus, in some examples, if one of the bands begins experiencing interference, the signal filtered according to that band can be discarded to suppress the interference.

Figure 6A:
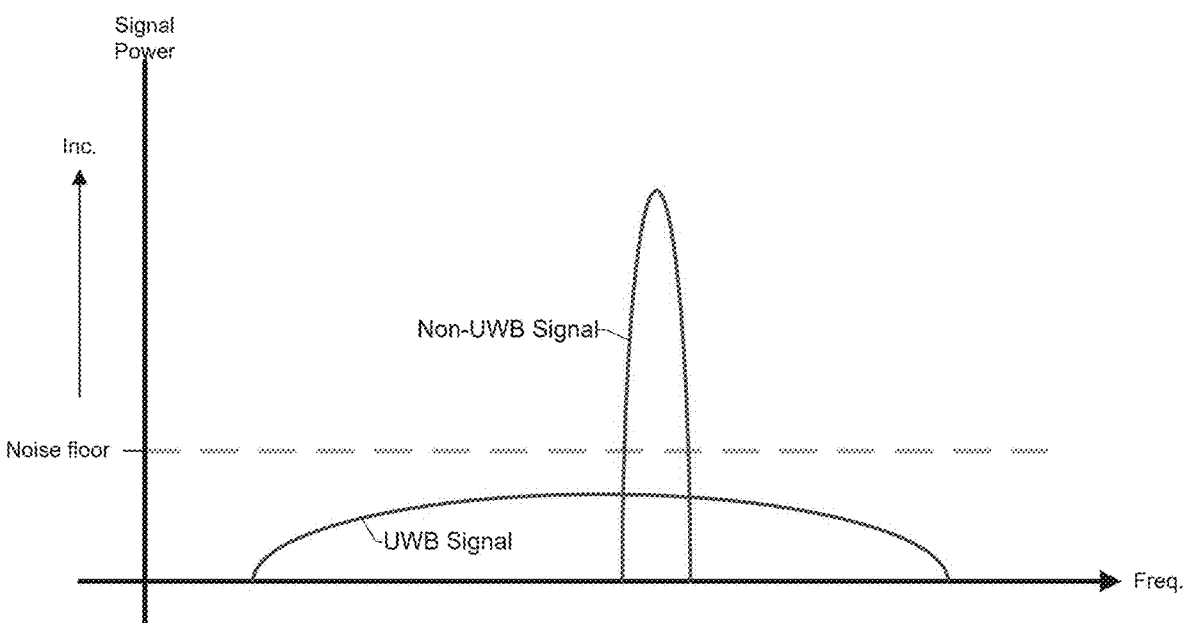
Figure 6B:
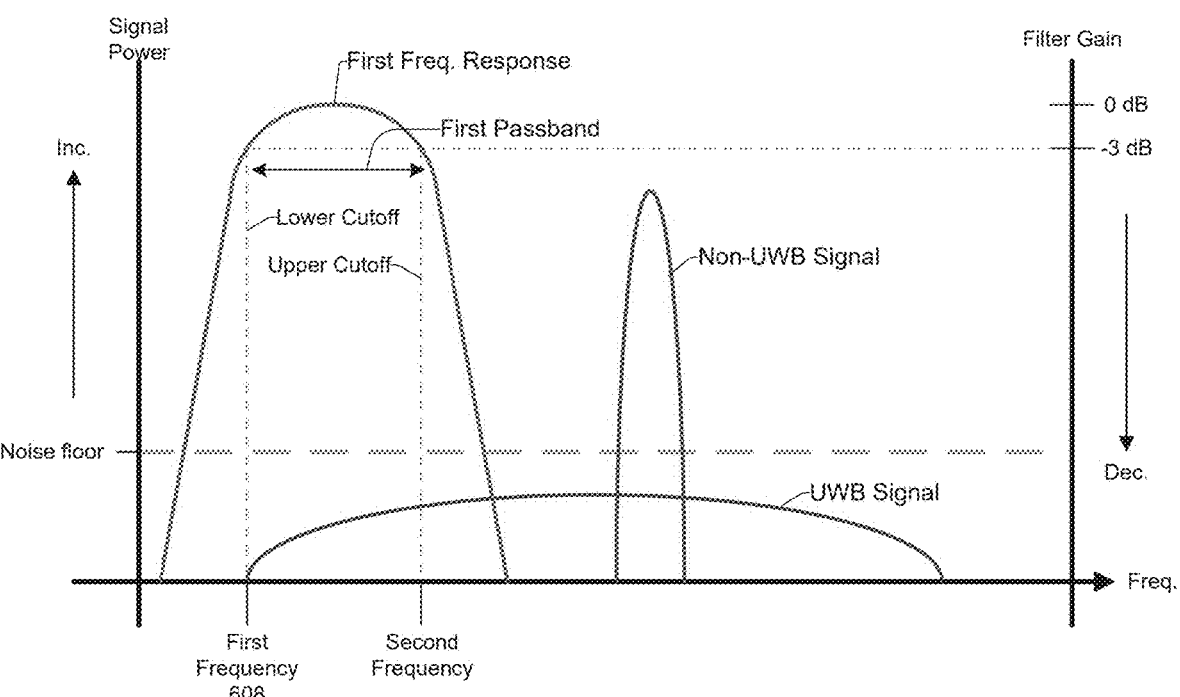
Figure 6C:
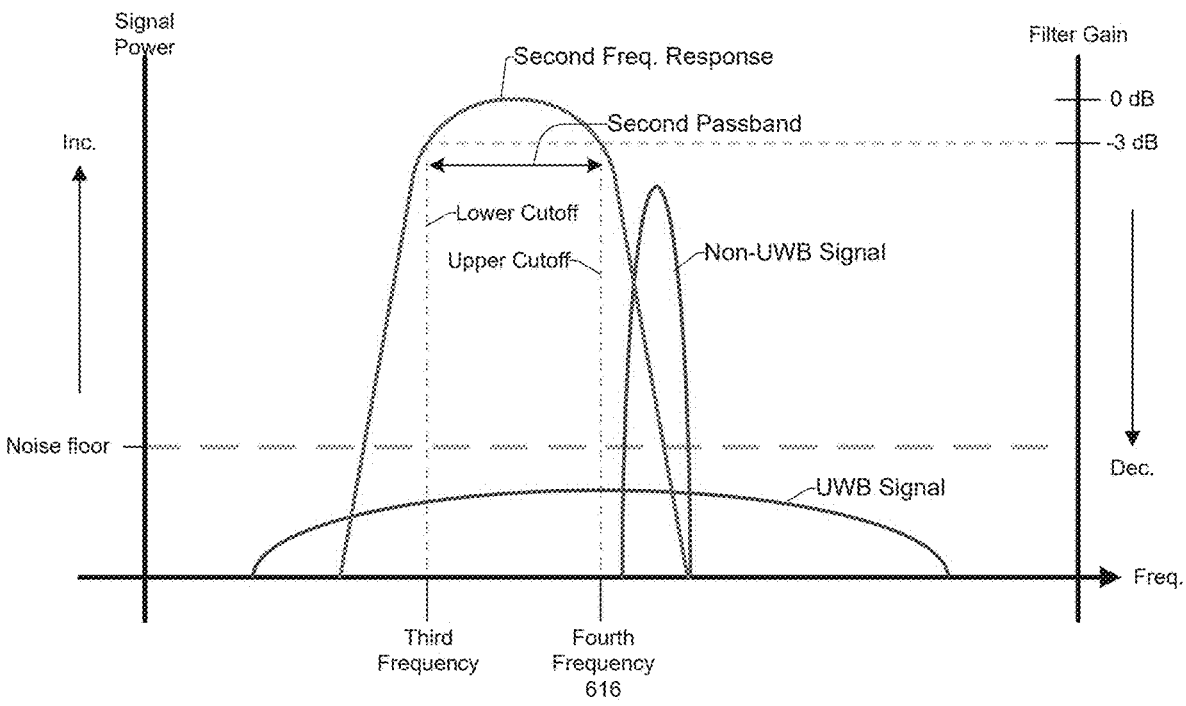
Figure 6D:
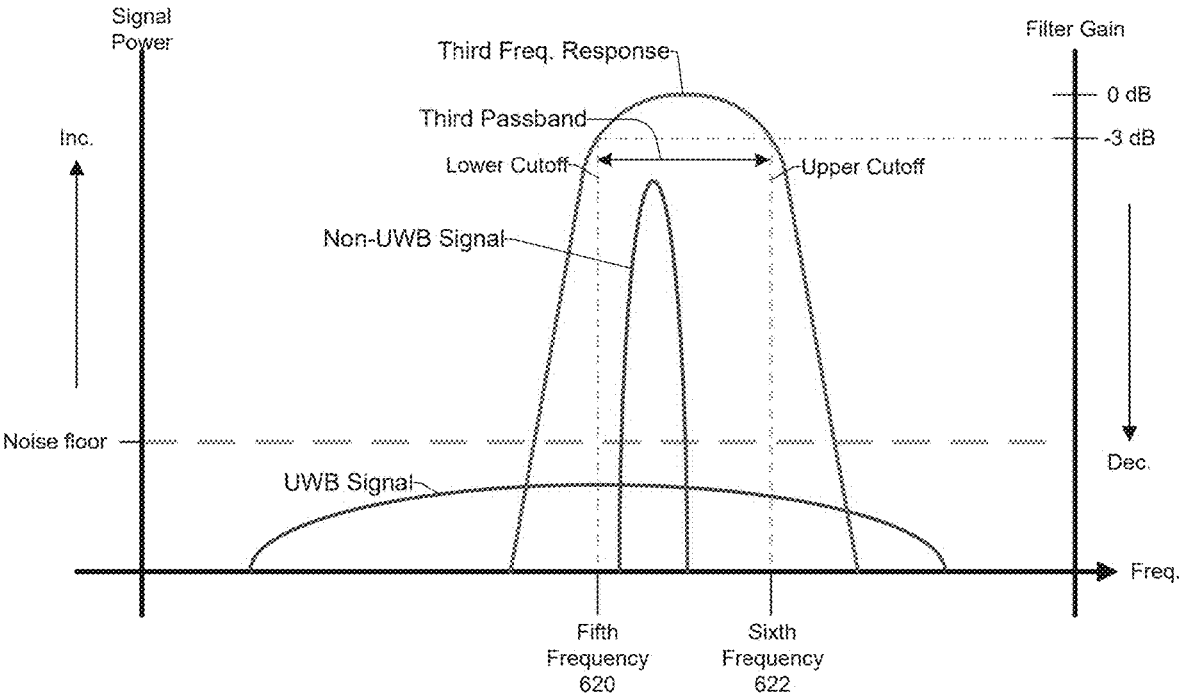
Figure 6E:
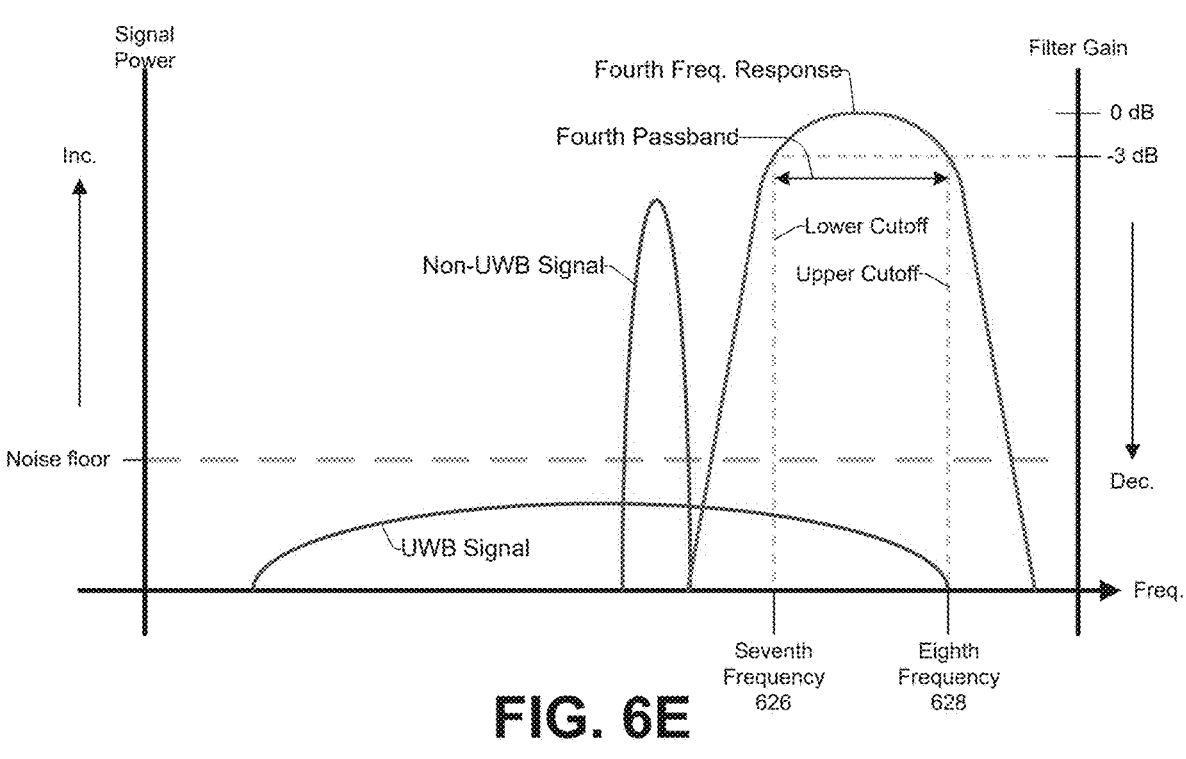
Figure 6F:
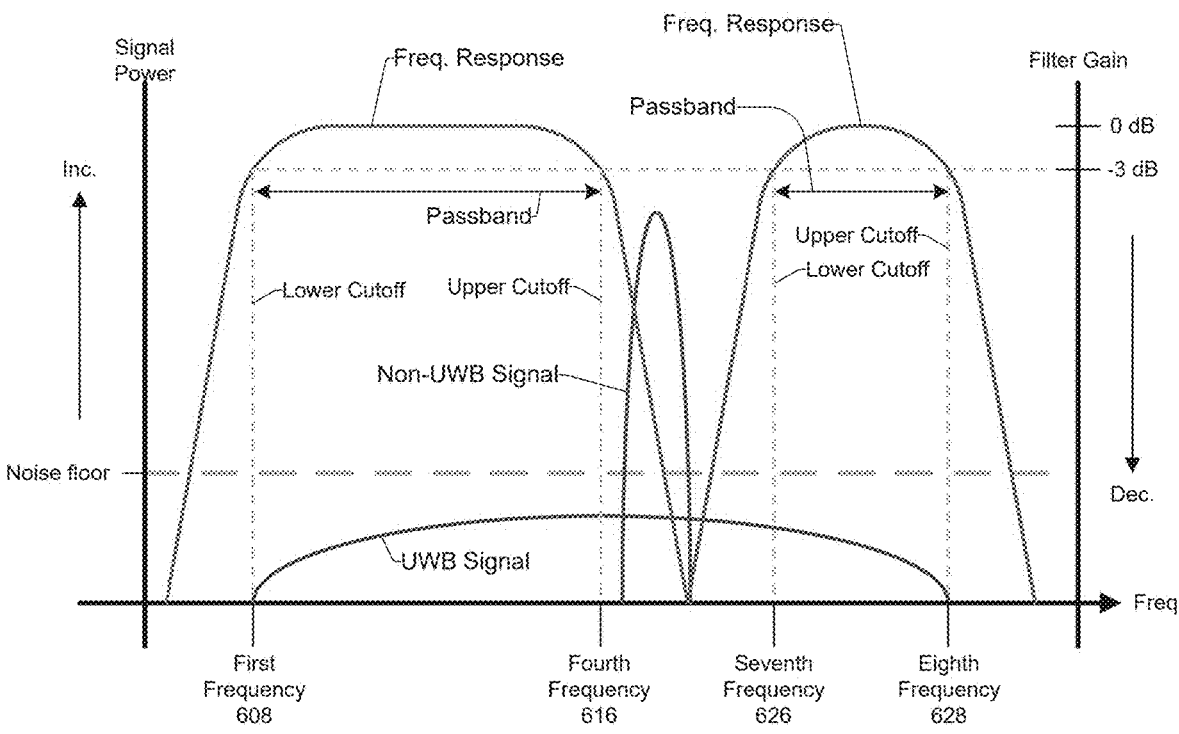

In some examples, four bands are "scanned", as illustrated in FIGS. 6A-6F. In the example illustrated, the baseband processor 112 determines that a non-UWB signal (e.g., 604) is present in the third band of the RF signal (between the fifth frequency 620 and the sixth frequency 622). In response, the control circuit 122 is configured to set the lower cutoff frequency of bandpass filter 104 to the first frequency 608 and set the upper cutoff frequency of bandpass filter 104 to the fourth frequency 616, and control circuit 322 is configured to set the lower cutoff frequency of bandpass filter 304 to the seventh frequency 626 and set the upper cutoff frequency of bandpass filter 304 to the eighth frequency 628, as illustrated in FIG. 6F. Thus, a width of one passband (the lower passband in this example) is different than a width of the other passband (the upper passband in this example), as shown in FIG. 6F.

Figure 7A:
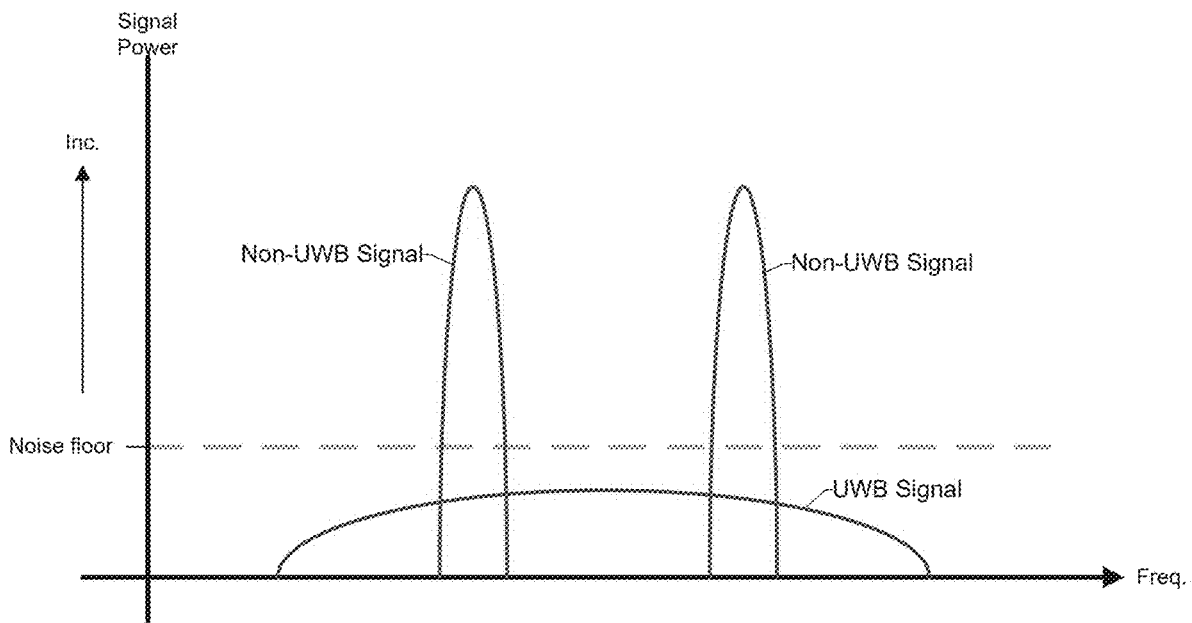
Figure 7B:
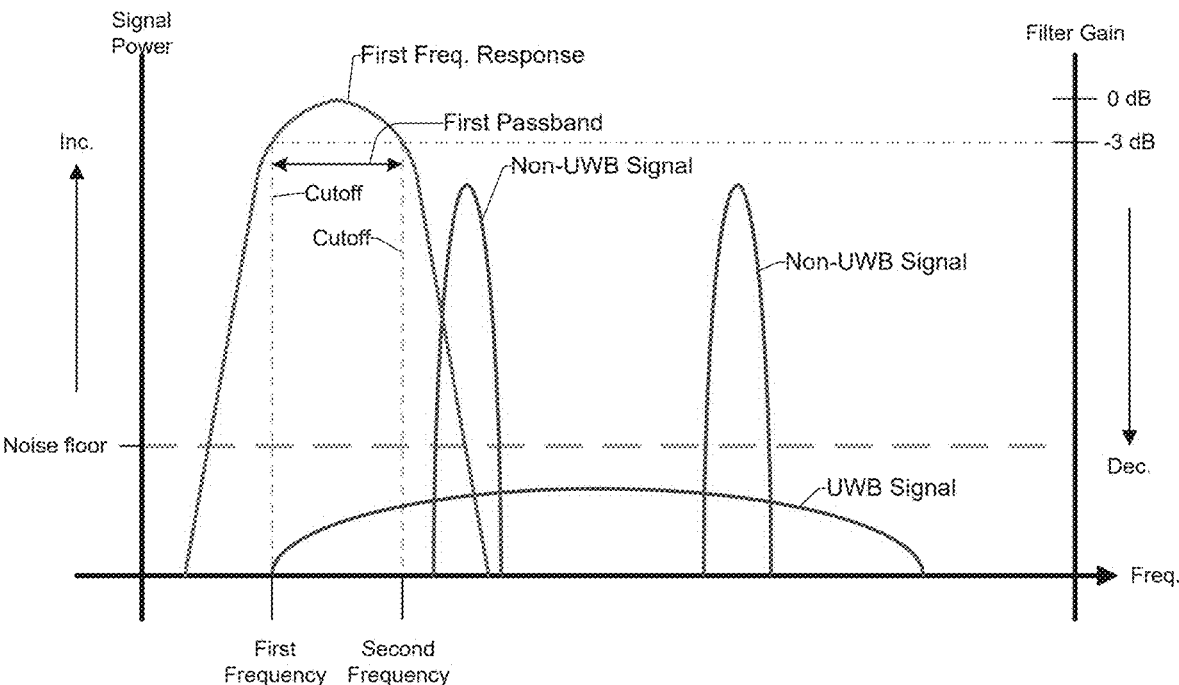
Figure 7C:
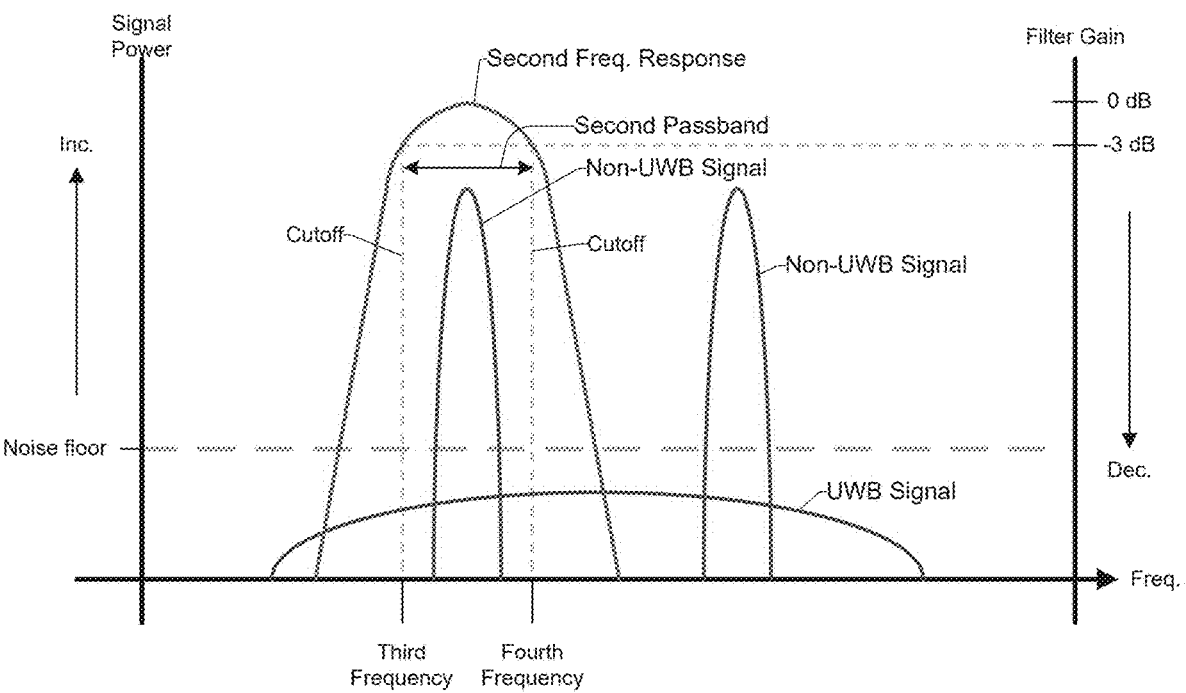
Figure 7D:
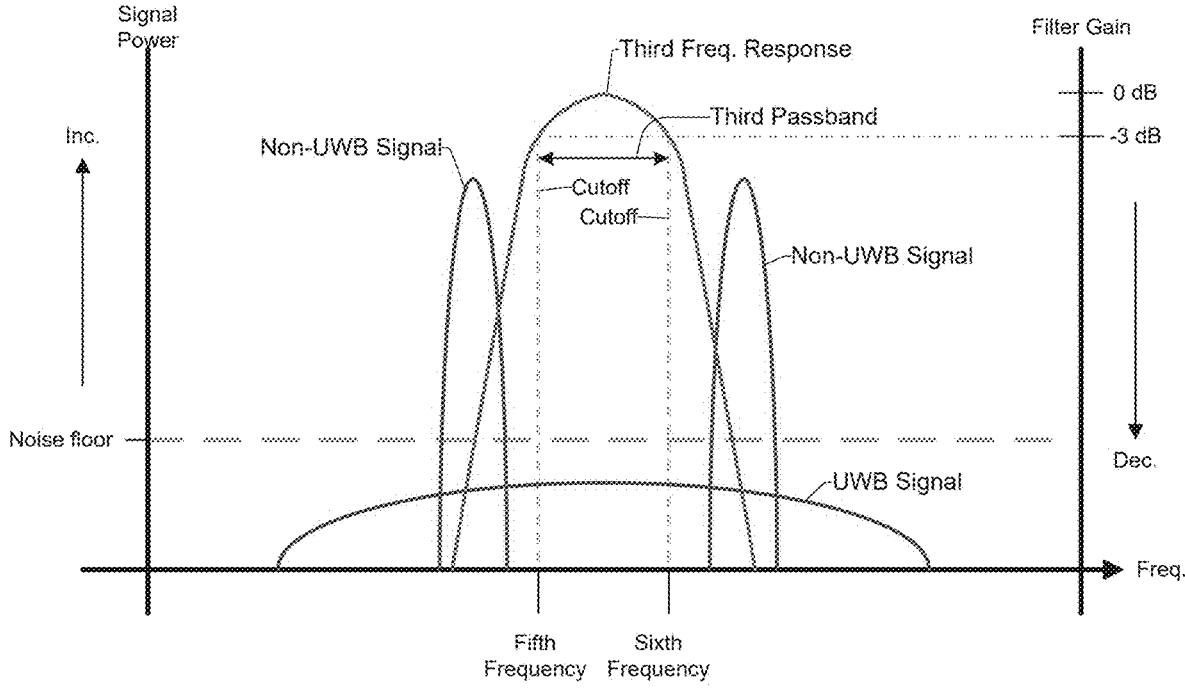
Figure 7E:
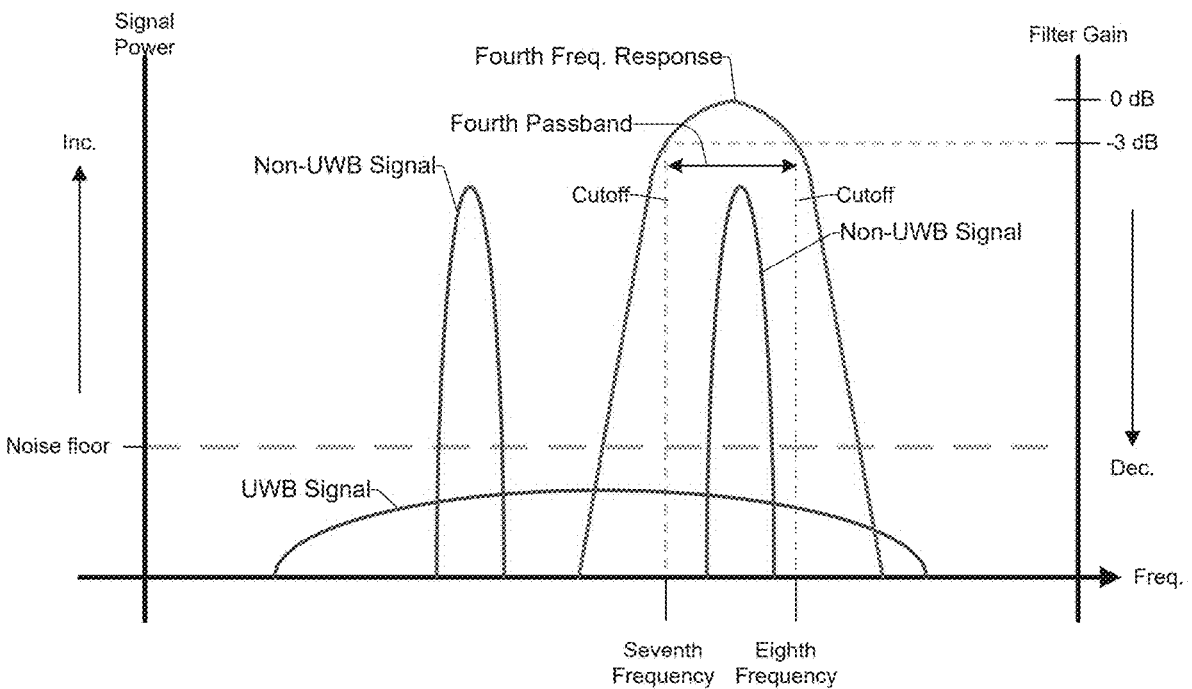
Figure 7F:
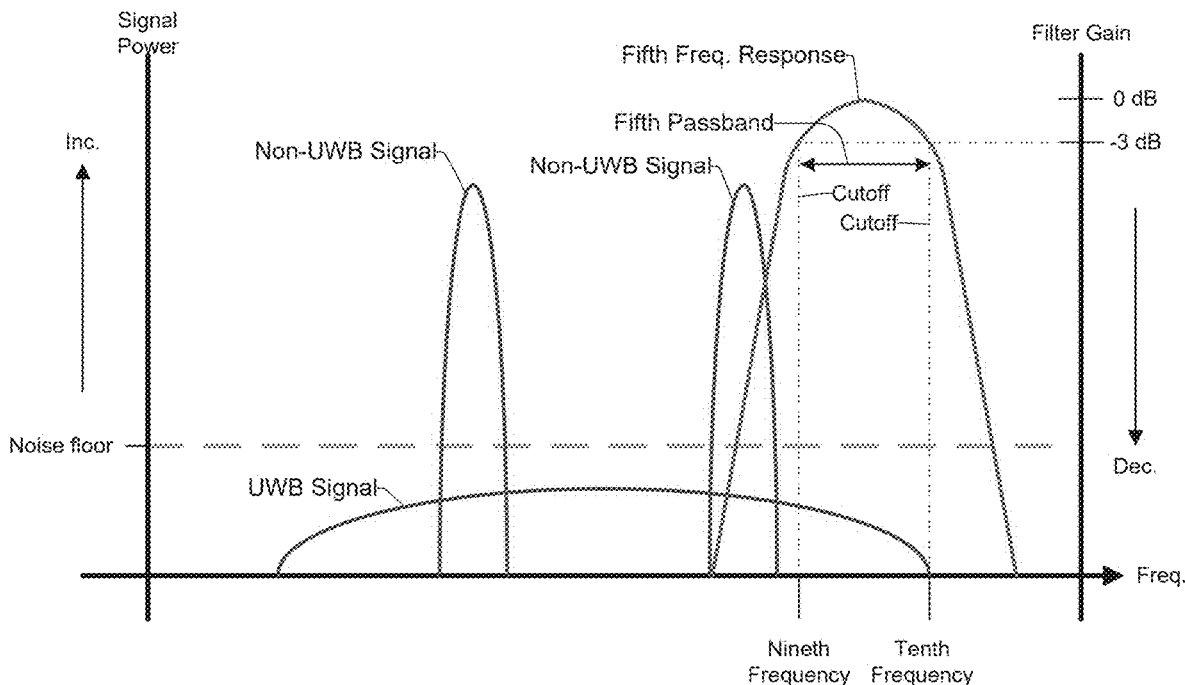
Figure 7G:
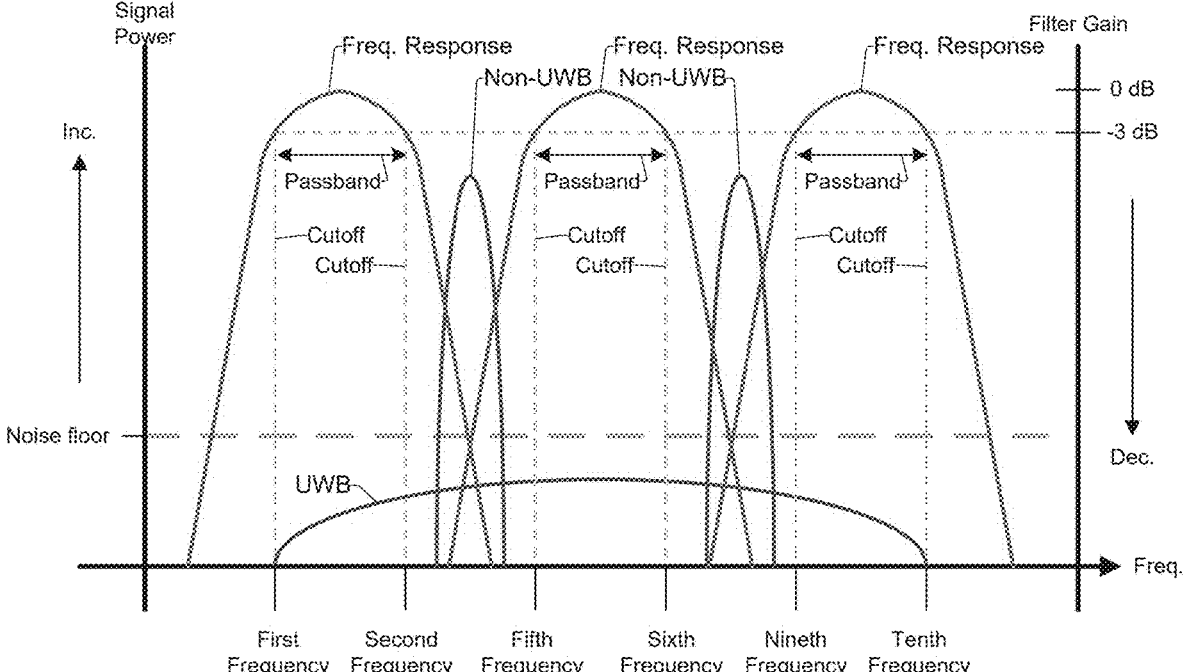

In some examples, the UWB radio includes a third receiver (not shown) and five bands are "scanned", as illustrated in FIGS. 7A-7G. In the example illustrated, the baseband processor 112 determines that a non-UWB signal is present in the second band of the RF signal and that a non-UWB signal is present in the fourth band of the RF signal. In response, the control circuit 122 is configured to set the passband of bandpass filter 104 to the first band, control circuit 322 is configured to set the passband of bandpass filter 304 to the third band, and a control circuit (not shown) of the third receiver (not shown) is configured to set the passband of a bandpass filter (not shown) of the third receiver to the fifth band, as illustrated in FIG. 7G. Thus, a kind of double notch filter is formed by the bandpass filters collectively.

FIG. 8 illustrates a method 800 of detecting and suppressing interference with a UWB radio. It will be appreciated that various methods are illustrated and described herein as a series of operations or events, but the illustrated ordering of such operations or events is not limiting. For example, some operations or events may occur in different orders and/or concurrently with other operations or events apart from those illustrated and/or described herein. Also, some illustrated operations or events are optional to implement one or more aspects or examples of this description. Further, one or more of the operations or events depicted herein may be performed in one or more separate operations and/or phases.

At 802, receive an RF signal. For example, an RF signal is received at antenna 102 of FIG. 1.

At 804, set a passband of one or more bandpass filters to a first passband. For example, control circuit 122 of FIG. 1 sets a passband of bandpass filter 104 of FIG. 1 to a first passband having a lower cutoff frequency at a first frequency and an upper cutoff frequency at a second frequency. In some examples, the control circuit sets the passband based on instructions from the baseband processor 112 of FIG. 1.

At 806, filter the RF signal according to the first passband. For example, bandpass filter 104 of FIG. 1 filters the RF signal. The filter substantially attenuates frequency components of the RF signal that are less than the lower cutoff frequency and that are greater than the upper cutoff frequency.

At 808, determine whether a non-UWB signal is present in the RF signal in the first passband. For example, baseband processor 112 of FIG. 1 analyzes the filtered signal and determines whether a non-UWB signal is present in the RF signal between the first frequency and the second frequency.

At 810, repeat 804, 806, 808 for one or more additional passbands. For example, UWB radio 100 of FIG. 1 repeats 804-808 for a second passband.

At 812, set the passband(s) of the bandpass filter(s) based on which of the passbands were determined to be devoid of non-UWB signals. For example, control circuit 122 of FIG. 1 sets the passband of bandpass filter 104 of FIG. 1 based on which of the "scanned" passbands were determined (by the baseband processor 112 of FIG. 1) to be free of interference.

At 814, filter the RF signal according to the passband(s). For example, bandpass filter 104 of FIG. 1 filters the RF signal according to the passbands which were determined to be interference-free.

At 816, decode the RF signal. For example, baseband processor 112 of FIG. 1 decodes the RF signal after the filtering.

Figure 9:
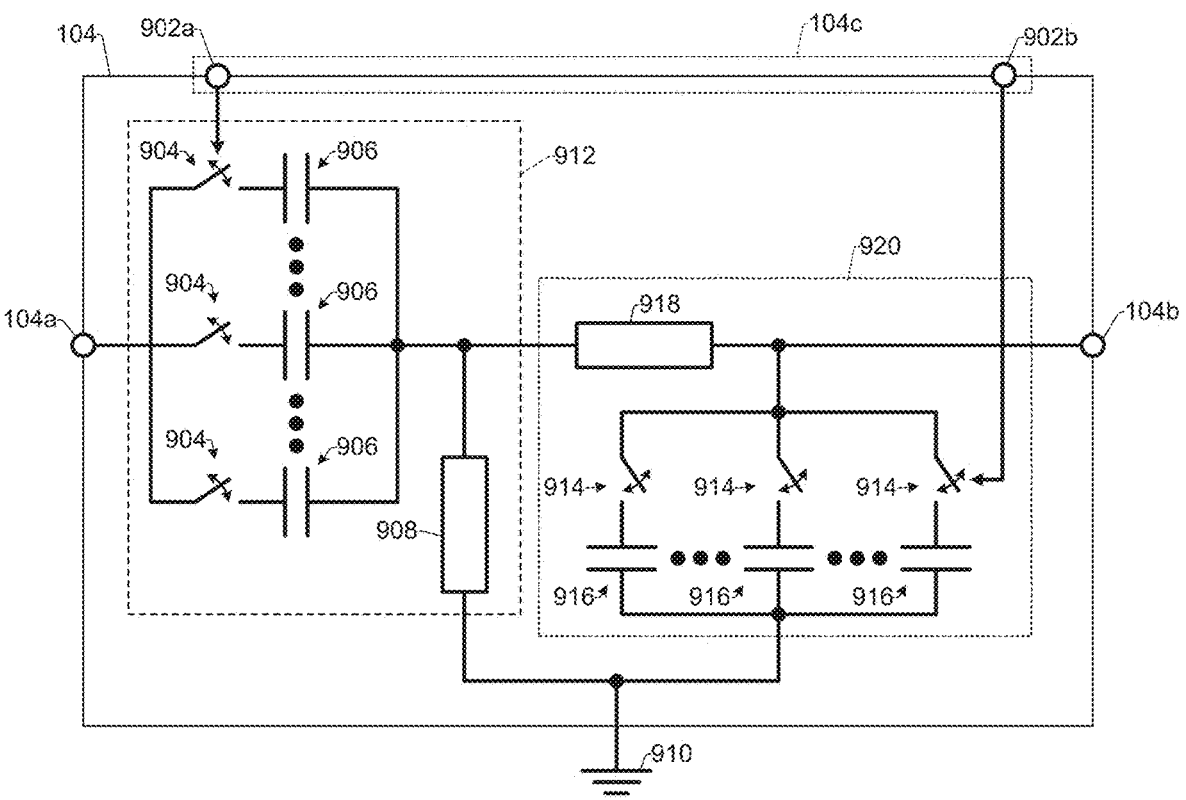
FIG. 9 illustrates an example of the bandpass filter of FIG. 1.

FIG. 9 illustrates an example of the bandpass filter 104 of FIG. 1.

The bandpass filter 104 has an input 104a, an output 104b, and a control terminal 104c. In some examples, the control terminal 104c includes a first sub-terminal 902a and a second sub-terminal 902b. The bandpass filter 104 includes a high-pass stage 912 and a lowpass stage 920.

The high-pass stage 912 includes a first plurality of switches 904 selectively coupling a respective plurality of capacitors 906 to the input 104a, and a resistor 908 coupled between the first capacitors 906 and ground 910. The first switches 904 have control terminals (not shown) coupled to the first sub-terminal 902a of the control terminal 104c. The control circuit 122 of FIG. 1 is configured to control the first switches 904. In some examples, the first capacitors 906 have varying capacitances. For example, a first capacitor has a first capacitance, a second capacitor has a second capacitance, different than the first capacitance, and so on. By controlling which of the first switches 904 are closed (via the control circuit 122), different capacitances can be "selected" (coupled between the input 104a and the output 104b). Thus, the lower cutoff frequency (which depends on the capacitance of the high-pass stage 912) can be tuned by controlling which of the first switches 904 are closed. For example, by closing a first switch (not labeled), a first capacitor (not labeled) is coupled and thus the lower cutoff frequency is set to a first frequency. By closing a second switch (not labeled), a second capacitor (not labeled), different than the first capacitor, is coupled and thus the lower cutoff frequency of the bandpass filter 104 is set to a second frequency, different than the first frequency. In some examples, multiple switches can be closed together to achieve different capacitances as well.

Similarly, the lowpass stage 920 includes a second plurality of switches 914 selectively coupling a respective plurality of capacitors 916 to the output 104b, and a resistor 918 coupled between the high-pass stage 912 and the output 104b. The second switches 914 have control terminals coupled to the second sub-terminal 902b of the control terminal 104c. The control circuit 122 of FIG. 1 is configured to control the second switches 914. The second capacitors 916 have varying capacitances. By controlling which of the second switches 914 are closed (via the control circuit 122), different capacitances can be "selected". Thus, the upper cutoff frequency (which depends on the capacitance of the lowpass stage 920) can be tuned by controlling which of the second switches 914 are closed.

In some examples, the switches 904, 914 may be or include transistors (e.g., metal-oxide field effect transistors or the like).

Thus, some aspects of the present disclosure relate to an ultra-wideband (UWB) radio including a first bandpass filter, a first analog-to-digital converter (ADC), a baseband processor, and a first control circuit. The first bandpass filter is configured to filter a radio frequency (RF) signal according a first lower cutoff frequency and a first upper cutoff frequency, thereby forming a first filtered signal. The first ADC is configured to convert the first filtered signal to a first digital signal. The baseband processor is configured to process the first digital signal. The first control circuit is configured to control the first lower cutoff frequency and the first upper cutoff frequency.

In some examples, the first control circuit is configured to set the first lower cutoff frequency to a first frequency and set the first upper cutoff frequency to a second frequency, greater than the first frequency, where a difference between the second frequency and the first frequency is less than 500 MHz. Further, the baseband processor is configured to determine whether a non-UWB signal is present in the RF signal between the first frequency and the second frequency in response to the first control circuit setting the first lower cutoff frequency to the first frequency and setting the first upper cutoff frequency to the second frequency.

In some examples, the first control circuit is configured to set the first lower cutoff frequency to a third frequency, greater than the first frequency, and set the first upper cutoff frequency to a fourth frequency, greater than the second frequency and the third frequency, where a difference between the fourth frequency and the third frequency is less than 500 MHz. Further, the baseband processor is configured to determine whether a non-UWB signal is present in the RF signal between the third frequency and the fourth frequency in response to the first control circuit setting the first lower cutoff frequency to the third frequency and setting the first upper cutoff frequency to the fourth frequency.

In some examples, the difference between the second frequency and the first frequency is approximately equal to the difference between the fourth frequency and the third frequency.

In some examples, the third frequency is less than or equal to the second frequency.

In some examples, the first control circuit is configured to: set the first lower cutoff frequency to the first frequency and set the first upper cutoff frequency to the second frequency in response to the baseband processor determining that a non-UWB signal is not present in the RF signal between the first frequency and the second frequency and determining that a non-UWB signal is present in the RF signal between the third frequency and the fourth frequency; set the first lower cutoff frequency to the third frequency and set the first upper cutoff frequency to the fourth frequency in response to the baseband processor determining that a non-UWB signal is present in the RF signal between the first frequency and the second frequency and determining that a non-UWB signal is not present in the RF signal between the third frequency and the fourth frequency; and set the first lower cutoff frequency to the first frequency and set the first upper cutoff frequency to the fourth frequency in response to the baseband processor determining that a non-UWB signal is not present in the RF signal between the first frequency and the second frequency and determining that a non-UWB signal is not present in the RF signal between the third frequency and the fourth frequency.

In some examples, the UWB radio further includes a second bandpass filter, a second ADC, and a second control circuit. The second bandpass filter is configured to filter the RF signal according a second lower cutoff frequency and a second upper cutoff frequency, thereby forming a second filtered signal. The second ADC is configured to convert the second filtered signal to a second digital signal, wherein the baseband processor is configured to process the second digital signal. The second control circuit is configured to control the second lower cutoff frequency and the second upper cutoff frequency.

In some examples, the first control circuit is configured to set the first lower cutoff frequency to a fifth frequency, greater than the third frequency, and set the first upper cutoff frequency to a sixth frequency, greater than the fifth frequency, where a difference between the sixth frequency and the fifth frequency is less than 500 MHz. Further, the baseband processor is configured to determine whether a non-UWB signal is present in the RF signal between the fifth frequency and the sixth frequency in response to the first control circuit setting the first lower cutoff frequency to the fifth frequency and setting the first upper cutoff frequency to the sixth frequency. Furthermore, in response to the baseband processor determining that a non-UWB signal is not present in the RF signal between the first frequency and the second frequency, determining that a non-UWB signal is present in the RF signal between the third frequency and the fourth frequency, and determining that a non-UWB signal is not present in the RF signal between the fifth frequency and the sixth frequency, the first control circuit is configured to set the first lower cutoff frequency to the first frequency and set the first upper cutoff frequency to the second frequency, and the second control circuit is configured to set the second lower cutoff frequency to the fifth frequency and set the second upper cutoff frequency to the sixth frequency.

Some aspects of the present disclosure relate to a method including setting a lower cutoff frequency of a first bandpass filter of an ultra-wideband (UWB) radio to a first frequency and setting an upper cutoff frequency of the first bandpass filter to a second frequency greater than the first frequency. The method includes receiving a radio frequency (RF) signal with the UWB radio. The method includes performing a first filtering of the RF signal with the first bandpass filter while the lower cutoff frequency is set to the first frequency and the upper cutoff frequency is set to the second frequency. The method includes determining whether a non-UWB signal is present in the RF signal between the first frequency and the second frequency in response to performing the first filtering. The method includes setting the lower cutoff frequency of the first bandpass filter to a third frequency, greater than the first frequency, and setting the upper cutoff frequency of the first bandpass filter to a fourth frequency greater than the second frequency and the third frequency. The method includes performing a second filtering of the RF signal with the first bandpass filter while the lower cutoff frequency is set to the third frequency and the upper cutoff frequency is set to the fourth frequency. The method includes determining whether a non-UWB signal is present in the RF signal between the third frequency and the fourth frequency in response to performing the second filtering.

In some examples, the method further includes setting the lower cutoff frequency of the first bandpass filter to the first frequency and setting the upper cutoff frequency of the first bandpass filter to the second frequency in response to determining that a non-UWB signal is not present in the RF signal between the first frequency and the second frequency and determining that a non-UWB signal is present in the RF signal between the third frequency and the fourth frequency. Further, the method includes setting the lower cutoff frequency of the first bandpass filter to the third frequency and setting the upper cutoff frequency of the first bandpass filter to the fourth frequency in response to determining that a non-UWB signal is present in the RF signal between the first frequency and the second frequency and determining that a non-UWB signal is not present in the RF signal between the third frequency and the fourth frequency. Furthermore, the method includes setting the lower cutoff frequency of the first bandpass filter to the first frequency and setting the upper cutoff frequency of the first bandpass filter to the fourth frequency in response to determining that a non-UWB signal is not present in the RF signal between the first frequency and the second frequency and determining that a non-UWB signal is not present in the RF signal between the third frequency and the fourth frequency.

In some examples, the method further includes performing a third filtering of the RF signal with the first bandpass filter in response to setting the lower cutoff frequency and the upper cutoff frequency in response to the determining. Further, the method includes decoding the RF signal in response to performing the third filtering.

In some examples, the method further includes setting the lower cutoff frequency of the first bandpass filter to a fifth frequency, greater than the third frequency, and setting the upper cutoff frequency of the first bandpass filter to a sixth frequency greater than the fourth frequency and the fifth frequency. Further, the method includes performing a third filtering of the RF signal with the first bandpass filter while the lower cutoff frequency is set to the fifth frequency and the upper cutoff frequency is set to the sixth frequency. Further, the method includes determining whether a non-UWB signal is present in the RF signal between the fifth frequency and the sixth frequency in response to performing the third filtering. Furthermore, the method includes setting the lower cutoff frequency of the first bandpass filter to the first frequency, setting the upper cutoff frequency of the first bandpass filter to the second frequency, setting a lower cutoff frequency of a second bandpass filter of the UWB radio to the fifth frequency, and setting an upper cutoff frequency of the second bandpass filter to the sixth frequency in response to determining that a non-UWB signal is not present in the RF signal between the first frequency and the second frequency, determining that a non-UWB signal is present in the RF signal between the third frequency and the fourth frequency, and determining that a non-UWB signal is not present in the RF signal between the fifth frequency and the sixth frequency.

In some examples, a difference between the second frequency and the first frequency is less than 500 MHz, and a difference between the fourth frequency and the third frequency is less than 500 MHz.

In some examples, the difference between the second frequency and the first frequency is different than the difference between the fourth frequency and the third frequency.

In some examples, the third frequency is less than or equal to the second frequency.

Some aspects of the present disclosure relate to an ultra-wideband (UWB) radio including a first variable bandpass filter, a first analog-to-digital converter (ADC), a baseband processor, and a first control circuit. The first variable bandpass filter has an input, an output, and a control terminal. The input of the first variable bandpass filter is coupled to a first antenna. The first ADC has an input and an output. The input of the first ADC is coupled to the output of the first variable bandpass filter. The baseband processor has a first input coupled to the output of the first ADC. The first control circuit has an output coupled to the control terminal of the first variable bandpass filter.

In some examples, an input of the first control circuit is coupled to a first output of the baseband processor.

In some examples, the first variable bandpass filter has a tunable lower cutoff frequency and a tunable upper cutoff frequency.

In some examples, the UWB radio further includes a second variable bandpass filter, a second ADC, and a second control circuit. The second variable bandpass filter has an input, an output, and a control terminal, the input of the second variable bandpass filter coupled to a second antenna, the second antenna spaced from the first antenna. The second ADC has an input and an output, the input of the second ADC coupled to the output of the second variable bandpass filter, the output of the second ADC coupled to a second input of the baseband processor. The second control circuit has an output coupled to the control terminal of the second variable bandpass filter.

In some examples, the first variable bandpass filter has a lower cutoff frequency at a first frequency and an upper cutoff frequency at a second frequency, and the second variable bandpass filter has a lower cutoff frequency at a third frequency, different than the first frequency, and an upper cutoff frequency at a fourth frequency, different than the first frequency and the second frequency.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

What is claimed is:

1. An ultra-wideband (UWB) radio comprising:
a first bandpass filter configured to filter a radio frequency (RF) signal according to a first lower cutoff frequency and a first upper cutoff frequency, thereby forming a first filtered signal;
a first analog-to-digital converter (ADC) configured to convert the first filtered signal to a first digital signal;
a baseband processor configured to process the first digital signal; and
a first control circuit configured to control the first lower cutoff frequency and the first upper cutoff frequency,
wherein the first control circuit is configured to set the first lower cutoff frequency to a first frequency and set the first upper cutoff frequency to a second frequency, greater than the first frequency, wherein a difference between the second frequency and the first frequency is less than 500 MHz,
wherein the baseband processor is configured to determine whether a non-UWB signal is present in the RF signal between the first frequency and the second frequency in response to the first control circuit setting the first lower cutoff frequency to the first frequency and setting the first upper cutoff frequency to the second frequency.

2. The UWB radio of claim 1, wherein the first control circuit is configured to set the first lower cutoff frequency to a third frequency, greater than the first frequency, and set the first upper cutoff frequency to a fourth frequency, greater than the second frequency and the third frequency, wherein a difference between the fourth frequency and the third frequency is less than 500 MHz,
wherein the baseband processor is configured to determine whether a non-UWB signal is present in the RF signal between the third frequency and the fourth frequency in response to the first control circuit setting the first lower cutoff frequency to the third frequency and setting the first upper cutoff frequency to the fourth frequency.

3. The UWB radio of claim 2, wherein the difference between the second frequency and the first frequency is approximately equal to the difference between the fourth frequency and the third frequency.

4. The UWB radio of claim 2, wherein the third frequency is less than or equal to the second frequency.

5. The UWB radio of claim 2, wherein the first control circuit is configured to:
set the first lower cutoff frequency to the first frequency and set the first upper cutoff frequency to the second frequency in response to the baseband processor determining that a non-UWB signal is not present in the RF signal between the first frequency and the second frequency and determining that a non-UWB signal is present in the RF signal between the third frequency and the fourth frequency;
set the first lower cutoff frequency to the third frequency and set the first upper cutoff frequency to the fourth frequency in response to the baseband processor determining that a non-UWB signal is present in the RF signal between the first frequency and the second frequency and determining that a non-UWB signal is not present in the RF signal between the third frequency and the fourth frequency; and set the first lower cutoff frequency to the first frequency and set the first upper cutoff frequency to the fourth frequency in response to the baseband processor determining that a non-UWB signal is not present in the RF signal between the first frequency and the second frequency and determining that a non-UWB signal is not present in the RF signal between the third frequency and the fourth frequency.

6. The UWB radio of claim 2, further comprising:

a second bandpass filter configured to filter the RF signal according to a second lower cutoff frequency and a second upper cutoff frequency, thereby forming a second filtered signal;

a second ADC configured to convert the second filtered signal to a second digital signal, wherein the baseband processor is configured to process the second digital signal; and a second control circuit configured to control the second lower cutoff frequency and the second upper cutoff frequency.

7. The UWB radio of claim 6, wherein the first control circuit is configured to set the first lower cutoff frequency to a fifth frequency, greater than the third frequency, and set the first upper cutoff frequency to a sixth frequency, greater than the fifth frequency, wherein a difference between the sixth frequency and the fifth frequency is less than 500 MHz, wherein the baseband processor is configured to determine whether a non-UWB signal is present in the RF signal between the fifth frequency and the sixth frequency in response to the first control circuit setting the first lower cutoff frequency to the fifth frequency and setting the first upper cutoff frequency to the sixth frequency, wherein in response to the baseband processor determining that a non-UWB signal is not present in the RF signal between the first frequency and the second frequency, determining that a non-UWB signal is present in the RF signal between the third frequency and the fourth frequency, and determining that a non-UWB signal is not present in the RF signal between the fifth frequency and the sixth frequency, the first control circuit is configured to set the first lower cutoff frequency to the first frequency and set the first upper cutoff frequency to the second frequency, and the second control circuit is configured to set the second lower cutoff frequency to the fifth frequency and set the second upper cutoff frequency to the sixth frequency.

8. A method comprising:

setting a lower cutoff frequency of a first bandpass filter of an ultra-wideband (UWB) radio to a first frequency and setting an upper cutoff frequency of the first bandpass filter to a second frequency greater than the first frequency;

receiving a radio frequency (RF) signal with the UWB radio;

performing a first filtering of the RF signal with the first bandpass filter while the lower cutoff frequency is set to the first frequency and the upper cutoff frequency is set to the second frequency;

determining whether a non-UWB signal is present in the RF signal between the first frequency and the second frequency in response to performing the first filtering;

setting the lower cutoff frequency of the first bandpass filter to a third frequency, greater than the first frequency, and setting the upper cutoff frequency of the first bandpass filter to a fourth frequency greater than the second frequency and the third frequency;

performing a second filtering of the RF signal with the first bandpass filter while the lower cutoff frequency is set to the third frequency and the upper cutoff frequency is set to the fourth frequency; and determining whether a non-UWB signal is present in the RF signal between the third frequency and the fourth frequency in response to performing the second filtering.

9. The method of claim 8, further comprising:

setting the lower cutoff frequency of the first bandpass filter to the first frequency and setting the upper cutoff frequency of the first bandpass filter to the second frequency in response to determining that a non-UWB signal is not present in the RF signal between the first frequency and the second frequency and determining that a non-UWB signal is present in the RF signal between the third frequency and the fourth frequency;

setting the lower cutoff frequency of the first bandpass filter to the third frequency and setting the upper cutoff frequency of the first bandpass filter to the fourth frequency in response to determining that a non-UWB signal is present in the RF signal between the first frequency and the second frequency and determining that a non-UWB signal is not present in the RF signal between the third frequency and the fourth frequency; and setting the lower cutoff frequency of the first bandpass filter to the first frequency and setting the upper cutoff frequency of the first bandpass filter to the fourth frequency in response to determining that a non-UWB signal is not present in the RF signal between the first frequency and the second frequency and determining that a non-UWB signal is not present in the RF signal between the third frequency and the fourth frequency.

10. The method of claim 9, further comprising:

performing a third filtering of the RF signal with the first bandpass filter in response to setting the lower cutoff frequency and the upper cutoff frequency in response to the determining; and decoding the RF signal in response to performing the third filtering.

11. The method of claim 8, further comprising:

setting the lower cutoff frequency of the first bandpass filter to a fifth frequency, greater than the third frequency, and setting the upper cutoff frequency of the first bandpass filter to a sixth frequency greater than the fourth frequency and the fifth frequency;

performing a third filtering of the RF signal with the first bandpass filter while the lower cutoff frequency is set to the fifth frequency and the upper cutoff frequency is set to the sixth frequency;

determining whether a non-UWB signal is present in the RF signal between the fifth frequency and the sixth frequency in response to performing the third filtering; and setting the lower cutoff frequency of the first bandpass filter to the first frequency, setting the upper cutoff frequency of the first bandpass filter to the second frequency, setting a lower cutoff frequency of a second bandpass filter of the UWB radio to the fifth frequency, and setting an upper cutoff frequency of the second bandpass filter to the sixth frequency in response to determining that a non-UWB signal is not present in the RF signal between the first frequency and the second frequency, determining that a non-UWB signal is present in the RF signal between the third frequency and the fourth frequency, and determining that a non-UWB signal is not present in the RF signal between the fifth frequency and the sixth frequency.

12. The method of claim 8, wherein a difference between the second frequency and the first frequency is less than 500 MHz, and wherein a difference between the fourth frequency and the third frequency is less than 500 MHz.

13. The method of claim 12, wherein the difference between the second frequency and the first frequency is different than the difference between the fourth frequency and the third frequency.

14. The method of claim 8, wherein the third frequency is less than or equal to the second frequency.

15. An ultra-wideband (UWB) radio comprising:

a bandpass filter;

a control circuit configured to set a passband of the bandpass filter to a first frequency band and to subsequently set the passband to a second frequency band different than the first frequency band, wherein the bandpass filter is configured to filter a radio frequency (RF) signal according to the passband, thereby forming a first filtered signal in response to the passband being set to the first frequency band and forming a second filtered signal in response to the passband being set to the second frequency band;

an analog-to-digital converter (ADC) configured to convert the first filtered signal to a first digital signal and convert the second filtered signal to a second digital signal; and a baseband processor configured to determine whether a non-UWB signal is present in the RF signal within the first frequency band based on the first digital signal and determine whether a non-UWB signal is present in the RF signal within the second frequency band based on the second digital signal.

16. The UWB radio of claim 15, wherein the baseband processor is configured to instruct the control circuit to set the passband of the bandpass filter to include the first frequency band in response to determining that a non-UWB signal is not present in the RF signal in the first frequency band, and wherein the baseband processor is configured to instruct the control circuit to set the passband of the bandpass filter to include the second frequency band in response to determining that a non-UWB signal is not present in the RF signal in the second frequency band.

17. The UWB radio of claim 15, wherein a bandwidth of the first frequency band and a bandwidth of the second frequency band are less than 500 MHz.

\* \* \* \* \*